(12) United States Patent
Maeda

(10) Patent No.: US 10,440,202 B2
(45) Date of Patent: Oct. 8, 2019

(54) INFORMATION PROCESSING APPARATUS AND COMMUNICATION SYSTEM

(71) Applicant: Oki Data Corporation, Tokyo (JP)

(72) Inventor: Masayuki Maeda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/708,429

(22) Filed: Sep. 19, 2017

(65) Prior Publication Data

US 2018/0097945 A1    Apr. 5, 2018

(30) Foreign Application Priority Data

Sep. 30, 2016    (JP) ................................. 2016-192449

(51) Int. Cl.
| | |
|---|---|
| G06F 3/12 | (2006.01) |
| H04N 1/00 | (2006.01) |
| H04L 29/08 | (2006.01) |
| H04M 1/725 | (2006.01) |
| H04W 88/06 | (2009.01) |
| H04W 4/80 | (2018.01) |

(52) U.S. Cl.
CPC ......... *H04N 1/00244* (2013.01); *G06F 3/121* (2013.01); *G06F 3/1229* (2013.01); *G06F 3/1292* (2013.01); *H04L 67/125* (2013.01); *H04M 1/7253* (2013.01); *H04N 1/00474* (2013.01); *H04W 4/80* (2018.02); *H04W 88/06* (2013.01); *H04L 67/12* (2013.01); *H04M 2250/04* (2013.01); *H04N 2201/006* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,699,332 B2* | 7/2017 | Kono | G06F 3/1204 |
| 2009/0103124 A1* | 4/2009 | Kimura | G06F 3/1204 |
| | | | 358/1.15 |
| 2012/0324336 A1* | 12/2012 | Maeda | H04N 1/00464 |
| | | | 715/234 |
| 2014/0293328 A1* | 10/2014 | Wakizaka | G06F 3/1292 |
| | | | 358/1.15 |
| 2014/0355048 A1* | 12/2014 | Kang | G06F 3/1292 |
| | | | 358/1.15 |
| 2014/0355063 A1* | 12/2014 | Jang | G06F 3/1205 |
| | | | 358/1.15 |
| 2015/0331648 A1* | 11/2015 | Tomomatsu | G06F 3/1258 |
| | | | 358/1.15 |
| 2016/0072553 A1* | 3/2016 | Tanji | H04B 5/0031 |
| | | | 455/41.1 |
| 2016/0344886 A1* | 11/2016 | Hirano | H04N 1/4426 |
| 2016/0381496 A1* | 12/2016 | Jang | G06K 7/10297 |
| | | | 455/41.1 |

FOREIGN PATENT DOCUMENTS

JP    2011-044092 A    3/2011

* cited by examiner

*Primary Examiner* — Dung D Tran

(74) *Attorney, Agent, or Firm* — Muncy, Geissler, Olds & Lowe, P.C.

(57) ABSTRACT

A Multifunction Peripheral (MFP) that communicates with a mobile terminal changes information to be transmitted to the mobile terminal according to the status of the MFP if the mobile terminal is within a predetermined range from the MFP.

14 Claims, 42 Drawing Sheets

FIG. 6
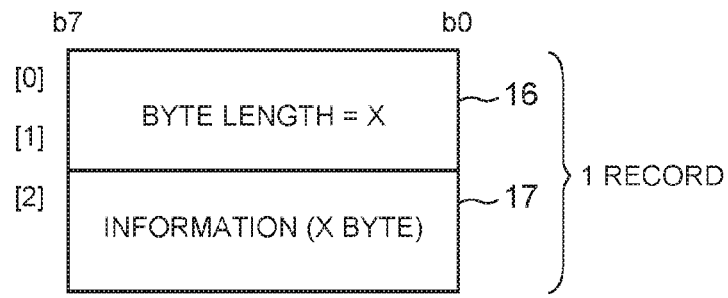
FIG. 7
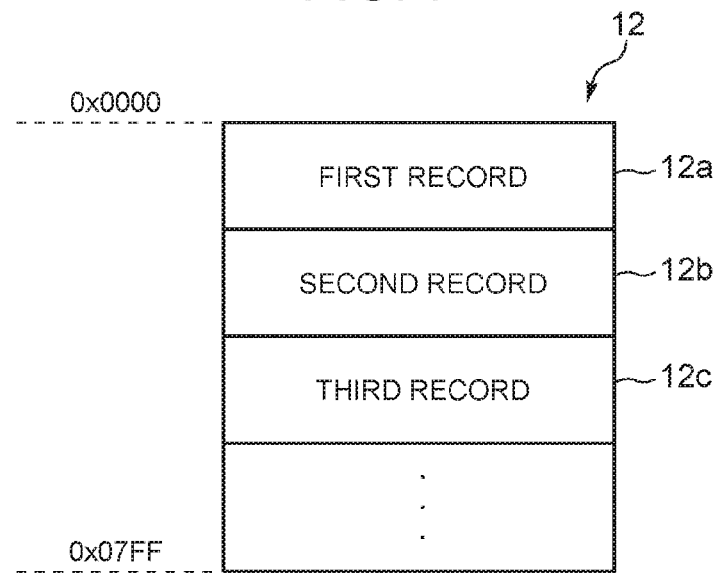
FIG. 8
| | 21 | 22 |
|---|---|---|
| [0] | 0 | ADDRESS TO AUTHENTICATION AP AREA |
| [1] | 10 | ADDRESS TO OPERATION GUIDE AP AREA |
| [2] | 20 | ADDRESS TO HOLD OVER PRINT AP AREA |
| [3] | -1 | |

FIG. 22

| AID | NAME | TERMINAL INFORMATION WRITING AREA ||| APPARATUS DISPLAY SCREEN IMAGE | APPARATUS INFORMATION WRITING AREA |||||  BEHAVIOR OF APPARATUS WHEN HOLDING OVER | BEHAVIOR OF TERMINAL AFTER HOLDING OVER |
| --- | --- | --- | --- | --- | --- | --- | --- | --- | --- | --- | --- | --- |
| | | AP STATUS INFORMATION | DISPLAY STATUS INFORMATION | AP UNIQUE INFORMATION | | FIRST RECORD | SECOND RECORD | THIRD RECORD | FOURTH RECORD | FIFTH RECORD | | |
| 0 | AUTHENTICATION AP | ACTIVATING | - | FIRST RECORD = AUTHENTICATION ID | PANEL LOCK SCREEN IMAGE | URL CORRESPONDING TO EXPLANATION OF IC CARD REGISTRATION OF ON-LINE MANUAL | - | - | - | - | Reads authentication ID of AP unique information and performs user authentication processing. When authentication fails, URL of online manual page of IC card registration is written in apparatus information writing area. | If URL is recorded in apparatus information writing area, corresponding WEB page is displayed. If not, do nothing. |
| | | | | | COPY STANDBY SCREEN IMAGE | | | | | | DO NOTHING | DO NOTHING |
| | | | | | MENU SETTING CHANGE SCREEN IMAGE | | | | | | DO NOTHING | DO NOTHING |

FIG. 23

| AID | NAME | \<colspan=6\>OPERATION GUIDE AP |
|---|---|---|---|---|---|---|---|

FIG. 24

| AID | NAME | TERMINAL INFORMATION WRITING AREA ||| APPARATUS DISPLAY SCREEN IMAGE | APPARATUS INFORMATION WRITING AREA ||||| BEHAVIOR OF APPARATUS WHEN HOLDING OVER | BEHAVIOR OF TERMINAL AFTER HOLDING OVER |
|---|---|---|---|---|---|---|---|---|---|---|---|---|
| | | AP STATUS INFORMATION | DISPLAY STATUS INFORMATION | AP UNIQUE INFORMATION | | FIRST RECORD | SECOND RECORD | THIRD RECORD | FOURTH RECORD | FIFTH RECORD | | |
| 2 | HOLD OVER PRINT AP | ACTIVATING | FOREGROUND DISPLAY | – | PANEL LOCK SCREEN IMAGE | – | – | – | – | – | DO NOTHING | DO NOTHING |
| | | ACTIVATING | FOREGROUND DISPLAY | – | COPY STANDBY SCREEN IMAGE | IP ADDRESS | SSID | PASSWORD | SECURITY TYPE | – | Writes necessary information for Wi-Fi connection in apparatus information area | Wi-Fi Direct printing is executed based on Wi-Fi connection information recorded in apparatus information writing area |
| | | ACTIVATING | FOREGROUND DISPLAY | – | MENU SETTING CHANGE SCREEN IMAGE | IP ADDRESS | SSID | PASSWORD | SECURITY TYPE | – | Writes necessary information for Wi-Fi connection in apparatus information area | Wi-Fi Direct printing is executed based on Wi-Fi connection information recorded in apparatus information writing area |
| | | ACTIVATING | FOREGROUND DISPLAY | – | PANEL LOCK SCREEN IMAGE | – | – | – | – | – | DO NOTHING | DO NOTHING |
| | | ACTIVATING | NON-FOREGROUND DISPLAY | – | MENU SETTING CHANGE SCREEN IMAGE | – | – | – | – | – | DO NOTHING | DO NOTHING |
| | | ACTIVATING | NON-FOREGROUND DISPLAY | – | MENU SETTING CHANGE SCREEN IMAGE | – | – | – | – | – | DO NOTHING | DO NOTHING |

FIG. 51

| AP | AP STATUS INFORMATION | APPARATUS DISPLAY SCREEN IMAGE | NFC TAG WRITING CONTENTS ||||||BEHAVIOR OF MOBILE TERMINAL AFTER HOLDING OVER |
| --- | --- | --- | --- | --- | --- | --- | --- | --- | --- |
| | | | FIRST RECORD | SECOND RECORD | THIRD RECORD | FOURTH RECORD | FIFTH RECORD | SIXTH RECORD | |
| OPERATION GUIDE AP | FOREGROUND DISPLAY | COPY STANDBY SCREEN IMAGE | IP ADDRESS | SSID | PASSWORD | SECURITY TYPE | URL CORRESPONDING TO EXPLANATION OF COPY OF ON-LINE MANUAL | OTHER MACHINE | DISPLAY WEB PAGE OF URL RECORDED IN NFC TAG |
| | | MENU SETTING CHANGE SCREEN IMAGE | IP ADDRESS | SSID | PASSWORD | SECURITY TYPE | URL OF MENU SETTING CHANGE SCREEN IMAGE IN APPARATUS WEB SERVER | OWN MACHINE | DISPLAY WEB PAGE OF URL RECORDED IN NFC TAG |

FIG. 52

| | | | NFC TAG WRITING CONTENTS | | | | | | BEHAVIOR OF MOBILE TERMINAL AFTER HOLDING OVER |
|---|---|---|---|---|---|---|---|---|---|
| | AP STATUS INFORMATION | APPARATUS DISPLAY SCREEN IMAGE | FIRST RECORD | SECOND RECORD | THIRD RECORD | FOURTH RECORD | FIFTH RECORD | SIXTH RECORD | |
| HOLD OVER PRINT AP | FOREGROUND DISPLAY | COPY STANDBY SCREEN IMAGE | IP ADDRESS | SSID | PASSWORD | SECURITY TYPE | URL CORRESPONDING TO EXPLANATION OF COPY OF ON-LINE MANUAL | OTHER MACHINE | Wi-Fi DIRECT PRINTING IS EXECUTED BASED ON Wi-Fi CONNECTION INFORMATION RECORDED IN NFC TAG |
| | | MENU SETTING CHANGE SCREEN IMAGE | IP ADDRESS | SSID | PASSWORD | SECURITY TYPE | URL OF MENU SETTING CHANGE SCREEN IMAGE IN APPARATUS WEB SERVER | OWN MACHINE | Wi-Fi DIRECT PRINTING IS EXECUTED BASED ON Wi-Fi CONNECTION INFORMATION RECORDED IN NFC TAG |

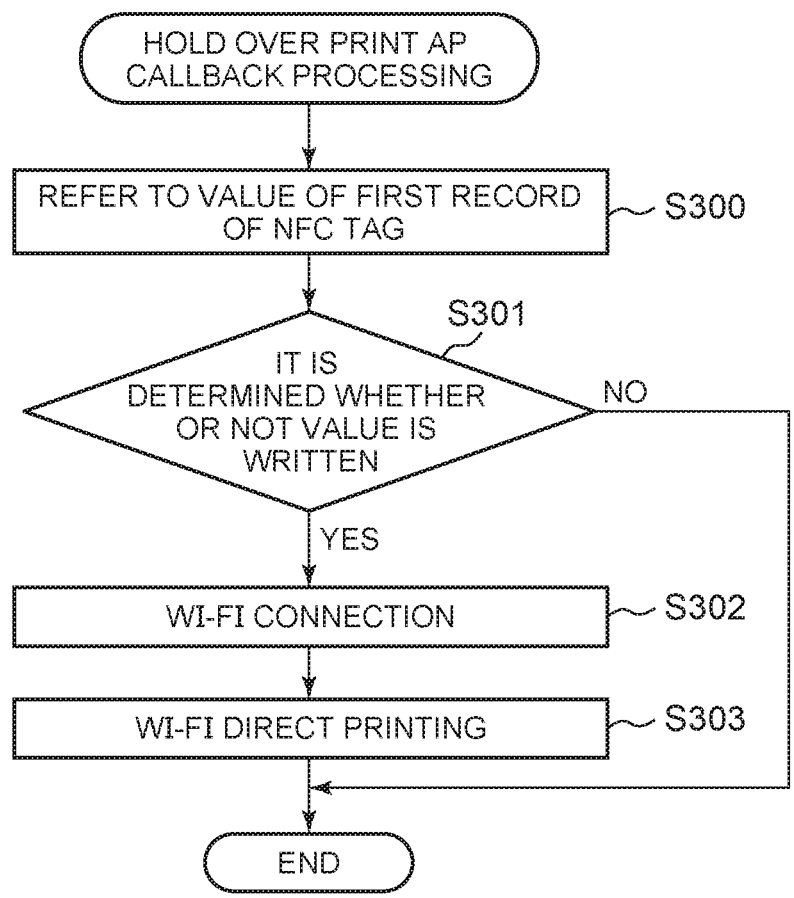

INFORMATION PROCESSING APPARATUS AND COMMUNICATION SYSTEM

TECHNICAL FIELD

The field of the disclosed subject may relate to an information processing apparatus and a communication system.

BACKGROUND ART

There is a portable terminal (mobile terminal) that communicates with an information processing apparatus by using Near Field Communication (NFC) type wireless communication. According to Japanese Patent Application Laid-Open (JP-A) No. 2011-044092, for example, when a request to read or write data is received from a communication terminal to the information processing apparatus, a conventional NFC device requests activation of the information processing apparatus in a power saving state. However, the conventional NFC device does not transmit appropriate information according to a status of a device to the NFC device.

SUMMARY

The summary identifies features of some example aspects, and is not an exclusive or exhaustive description of the disclosed subject matter. Whether features or aspects are included in, or omitted from this Summary is not intended as indicative of relative importance of such features. Additional features and aspects are described, and will become apparent to persons skilled in the art upon reading the following detailed description and viewing the drawings that form a part thereof.

In an aspect, a technique is provided for transmitting appropriate information according to a status of an image forming apparatus from the image forming apparatus to the information processing apparatus.

An exemplary second information processing apparatus that communicates with the first information processing apparatus is disclosed. The second information processing apparatus includes a communication unit that communicates with the first information processing apparatus; (2) a first acquiring unit that acquires first apparatus status information that is apparatus status information of the first information processing apparatus from the first information processing apparatus via the communication unit; (3) a second acquiring unit that acquires second apparatus status information that is apparatus status information of the second information processing apparatus; and (4) a control unit that changes a predetermined behavior based on the first apparatus status information and the second apparatus status information.

The invention also relates to a communication system in which the first information processing apparatus and the second information processing apparatus communicate, which includes (1) the second information processing apparatus including a communication unit, a first acquiring unit, a second acquiring unit, and a first control unit, (2) the communication unit that communicates with the first information processing apparatus; (3) the first acquiring unit that acquires first apparatus status information that is apparatus status information of the first information processing apparatus from the first information processing apparatus via the communication unit; (4) the second acquiring unit that acquires second apparatus status information that is apparatus status information of the second information processing apparatus; and (5) the first control unit that changes a predetermined behavior based on the first apparatus status information and the second apparatus status information. It is noted that an abbreviation "AP" means an appreciation throughout the specification. For example, "AP area" means an application area. "AP control unit" means an application unit.

BRIEF DESCRIPTION OF THE DRAWINGS

The accompanying drawings are presented to aid in the description of examples of one or more aspects of the disclosed subject matter and are provided solely for illustration of the examples and not limitation thereof.

FIG. 6 is a diagram illustrating a structure of one record including AP unique information according to the first embodiment of the invention.

FIG. 7 is a diagram illustrating an internal structure of an apparatus information writing area according to the first embodiment of the invention.

FIG. 8 is a diagram illustrating an AID definition table of the mobile terminal according to the first embodiment of the invention.

FIG. 22 is a diagram illustrating a first operation matrix according to each status between the mobile terminal and the MFP in the first embodiment of the invention.

FIG. 23 is a diagram illustrating a second operation matrix according to each status between the mobile terminal and the MFP in the first embodiment of the invention.

FIG. 24 is a diagram illustrating a third operation matrix according to each status between the mobile terminal and the MFP in the first embodiment of the invention.

FIG. 51 is a diagram illustrating the first operation matrix according to each status between the mobile terminal and the MFP in the second embodiment of the invention.

FIG. 52 is a diagram illustrating the second operation matrix according to each status between the mobile terminal and the MFP in the second embodiment of the invention.

FIG. 60 is a flowchart illustrating callback processing of the hold over print AP according to the second embodiment of the invention.

DESCRIPTION OF THE EMBODIMENTS (1) First Embodiment

Figure 1:
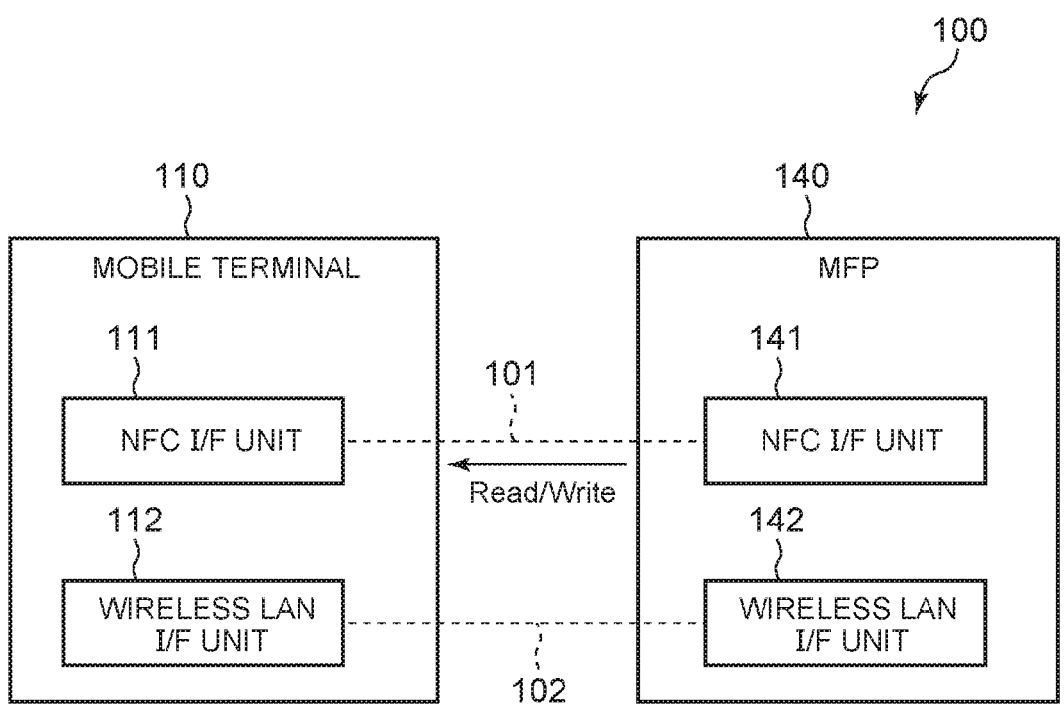
FIG. 1 is a diagram of a communication system according to a first embodiment of the invention.

FIG. 1 is a diagram of a communication system 100 according to a first embodiment of the invention.

The communication system 100 includes a mobile terminal 110 as an information processing apparatus and a Multifunction Peripheral (MFP) 140 as an image forming apparatus that communicates with the mobile terminal 110. The mobile terminal 110 is also referred to as a first information processing apparatus. The MFP 140 is also referred to as a second information processing apparatus.

The mobile terminal 110 includes an NFC I/F unit 111 and a wireless Local Area Network (LAN) I/F unit 112.

The MFP 140 includes an NFC I/F unit 141 and a wireless LAN I/F unit 142. In the application, these two interface units 141 and 142 function as communication units that are described in the claim section. These units works to transmit information to and to receive from the mobile terminal(s).

The NFC I/F unit 111 and the NFC I/F unit 141 are interface for executing an NFC type wireless communication 101 according to the NFC standard. The NFC I/F unit 111 is also referred to as a first communication interface unit. The NFC I/F unit 141 is also referred to as a second communication interface unit. A first communication interface unit is also referred to as a communication unit. A second communication interface unit is also referred to as a communication unit.

The wireless LAN I/F unit 112 and the wireless LAN I/F unit 142 are interface for connecting to the Internet via the wireless LAN according to the Wireless Fidelity (Wi-Fi) standard. The wireless LAN I/F unit 112 is also referred to as a third communication interface unit. The wireless LAN I/F unit 142 is also referred to as a fourth communication interface unit. A third communication interface unit is also referred to as a communication unit. A fourth communication interface unit is also referred to as a communication unit.

Since the wireless LAN I/F unit 142 of the MFP 140 supports the Wi-Fi direct type, it is possible to realize the wireless LAN communication 102 by Peer to Peer (P2P) with the target device without going through the access point.

In the first embodiment, in terms of NFC communication, the MFP 140 functions as a Reader/Writer that performs reading and writing of information.

Figure 2:
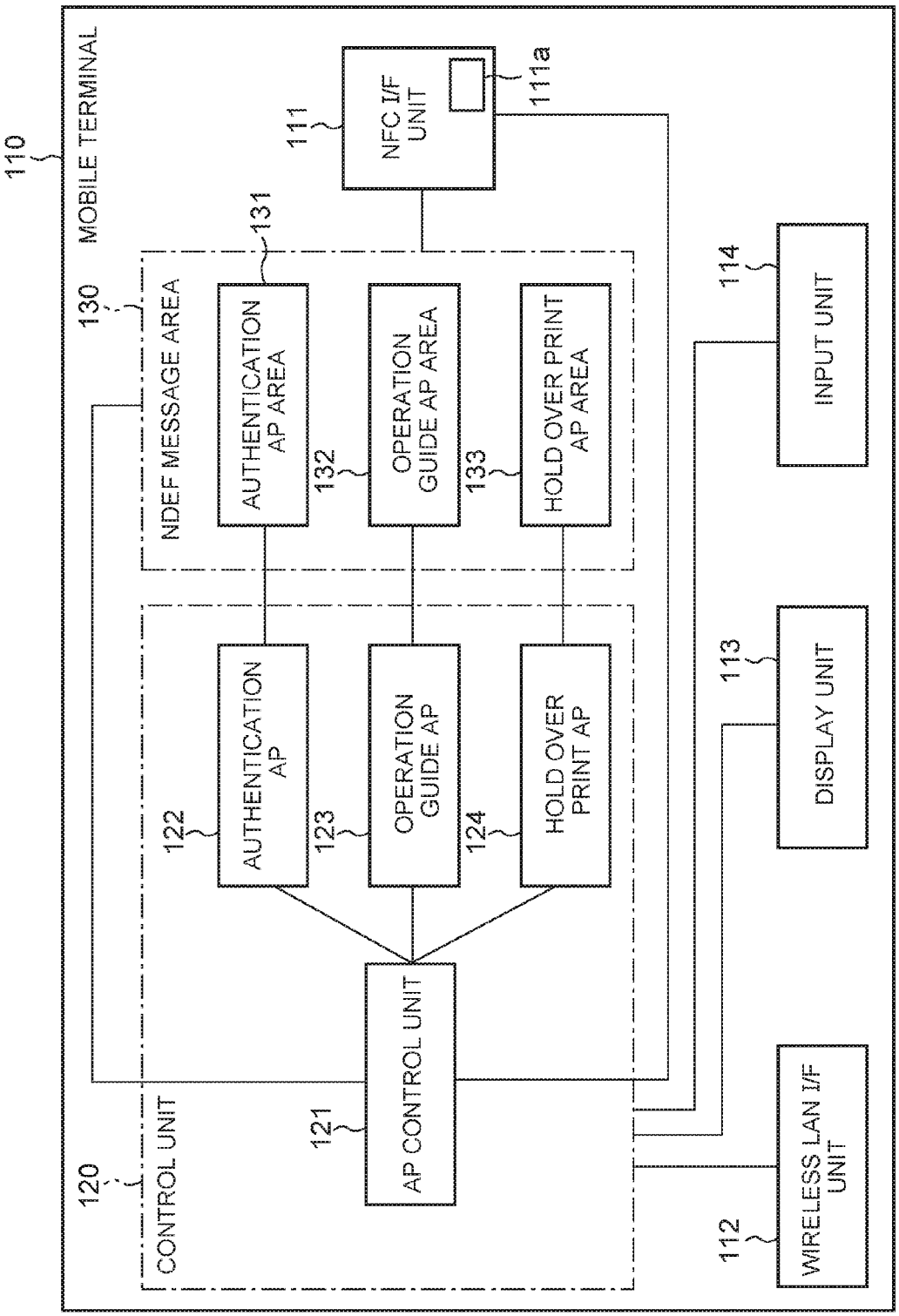
FIG. 2 is a block diagram illustrating a configuration of a mobile terminal according to the first embodiment of the invention.

FIG. 2 is a block diagram illustrating a configuration of a mobile terminal according to the first embodiment of the invention.

The mobile terminal 110 includes an NFC I/F unit 111, a wireless LAN I/F unit 112, a display unit 113, an input unit 114, a control unit 120, and an NFC Data Exchange Format (NDEF) message area 130 as a storage unit.

The display unit 113 displays various images. The display unit 113 is also referred to as a first display unit.

The input unit 114 receives input of an instruction from the user.

The control unit 120 includes an AP control unit 121, an authentication AP 122, an operation guide AP 123, and a hold over print AP 124.

In the first embodiment, three kinds of applications can operate on the mobile terminal 110. Three kinds of APs are the authentication AP 122, the operation guide AP 123, and the hold over print AP 124. The control unit 120 has an AP control unit 121 that comprehensively manages these three kinds of APs.

The NDEF message area 130 functions as a data area to be read and written from the MFP 140 via the NFC I/F unit 111.

The NDEF message area 130 is partitioned into areas for each AP. In the first embodiment, the NDEF message area 130 includes an authentication AP area 131, an operation guide AP area 132, and a print AP area 133. The NDEF message area for each AP is 4 KB in the first embodiment.

Figure 3:
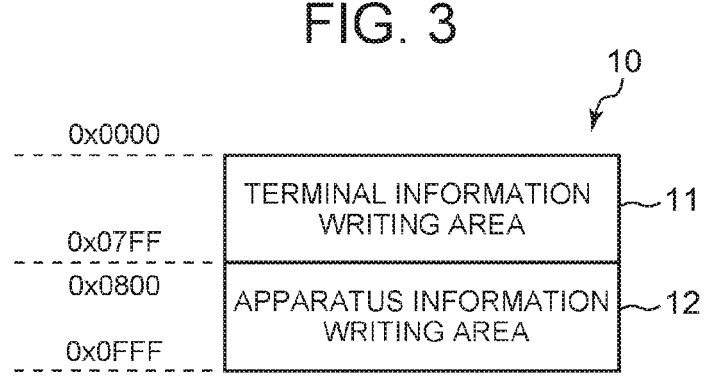
FIG. 3 is a diagram illustrating an internal structure of an authentication AP area, an operation guide AP area, and a hold over print AP area according to the first embodiment of the invention.

FIG. 3 is a diagram illustrating an internal structure of an authentication AP area, an operation guide AP area, and a hold over print AP area according to the first embodiment of the invention.

The authentication AP area 131, the operation guide AP area 132, and the over hold print AP area 133 all have the same structure. In the following, it will be described as the NDEF message area 10 for AP.

The NDEF message area 10 includes a terminal information writing area 11 for writing by the mobile terminal 110 and reading by the MFP 140. Further, the NDEF message area 10 includes an apparatus information writing area 12 for writing by the MFP 140 and reading by the mobile terminal 110. The terminal information writing area and apparatus information writing area are each 2 KB in the first embodiment.

Figure 4:
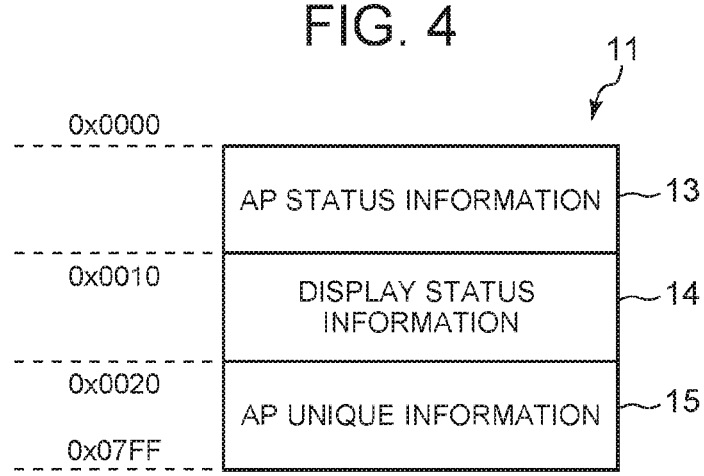
FIG. 4 is a diagram illustrating an internal structure of a terminal information writing area according to the first embodiment of the invention.

FIG. 4 is a diagram illustrating an internal structure of a terminal information writing area according to the first embodiment of the invention.

The terminal information writing area 11 stores AP status information 13, display status information 14, and AP unique information 15.

In the first embodiment, the area in which the AP status information 13 is stored is an area of 16 bytes length. When the AP status information 13 is "0", the corresponding AP is installed but not operating, and if the AP status information 13 is "1", the corresponding AP is installed and activating.

In the first embodiment, the area in which the display status information 14 is stored is an area of 16 bytes length. When the display state information 14 is "0", the corresponding AP is activated, but it is not displayed on the foreground of the screen image of the mobile terminal 110, and if the display status information 14 is "1", the corresponding AP is activated and is displayed on the foreground of the screen image of the mobile terminal 110.

The area in which the AP unique information 15 is stored is an area where each AP can freely use.

Figure 5:
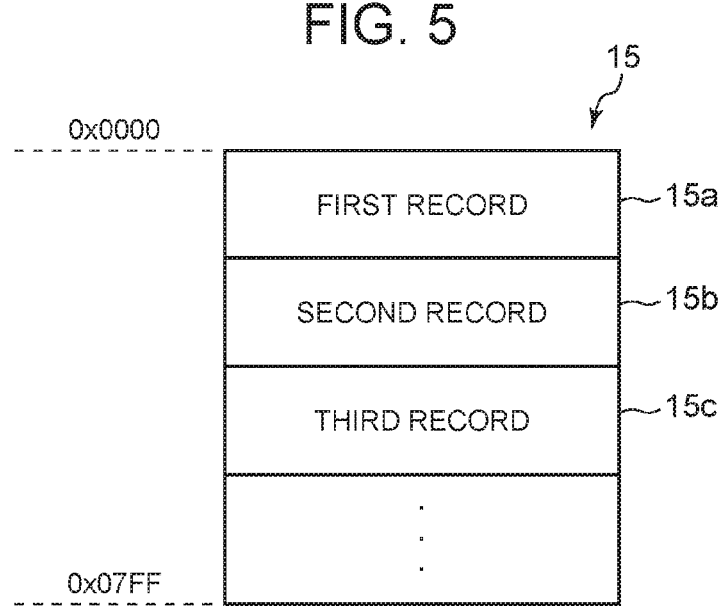
FIG. 5 is a diagram illustrating an internal structure of AP unique information according to the first embodiment of the invention.

FIG. 5 is a diagram illustrating an internal structure of AP unique information according to the first embodiment of the invention.

In the first embodiment, only the authentication AP 122 uses the AP unique information 15.

As shown in the drawing, the AP unique information 15 includes N variable length records (N is an integer of 1 or more). As shown in FIG. 6, the structure of one record is 16 bytes length of information 17 in which the first 2 bytes are consecutive thereafter. In FIG. 5, the first record 15 a, the second record 15 b, the third record 15 c, . . . are described, but the number of records differs depending on the AP.

FIG. 7 is a diagram illustrating an internal structure of an apparatus information writing area according to the first embodiment of the invention.

As shown in the drawing, the apparatus information writing area 12 includes M variable length records (M is an integer of 1 or more). The structure of one record is as shown in FIG. 6 described above. The information written in the apparatus information writing area 12 is different for each AP. In FIG. 7, the first record 12 a, the second record 12 b, the third record 12 c, . . . are described, but the number of records differs depending on the AP.

The apparatus information writing area 12 of the authentication AP area 131 is used by only the first record 12 a. Only when the authentication operation in the MFP 140 fails, URL information is written from the MFP 140 in the first record 12 a.

In the apparatus information writing area 12 of the operation guide AP area 132, URL information is written from the MFP 140 to the first record 12 a. The second record 12b to the fifth record may be written with information or not written. When information is written in the second record 12 b to the fifth record, information necessary for Wi-Fi connection from the mobile terminal 110 to the MFP 140 is written.

In the apparatus information writing area 12 of the hold over print AP area 133, information necessary for Wi-Fi connection from the mobile terminal 110 to the MFP 140 is written in the first record 12 a to the fourth record from the MFP 140. However, there are cases where it is not written.

FIG. 8 is a diagram illustrating an AID definition table of the mobile terminal according to the first embodiment of the invention.

The AID definition table 20 has an AID column 21 and an address column 22.

The AID column 21 stores a unique ID called an AID (Application ID) for each AP.

In the NDEF message area 130, the address column 22 stores an address indicating an area corresponding to each AID.

In the first embodiment, the NFC I/F unit 111 of the mobile terminal 110 includes a memory 111 a, and the AID definition table 20 is stored in the memory 111 a.

Figure 9:
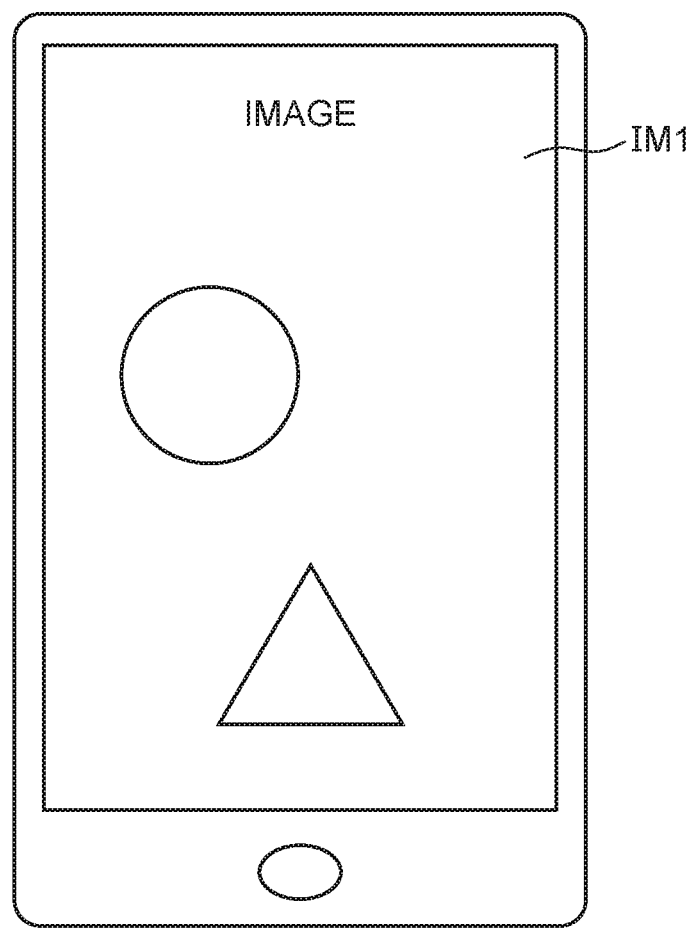
FIG. 9 is a diagram of a print image according to the first embodiment of the invention.

FIG. 9 is a diagram of a print image (forming image) IM1 displayed by the hold over print AP 124 on the display unit 113 according to the first embodiment of the invention. If the user desires to print the image of the image data stored in the mobile terminal 110, the user activates the hold over print AP 124 and causes the display unit 113 to display the print image IM1. Then, by simply holding the mobile terminal 110, it is possible to acquire the printing result in a mobile terminal detection area (not shown) of the MFP 140.

Figure 10:
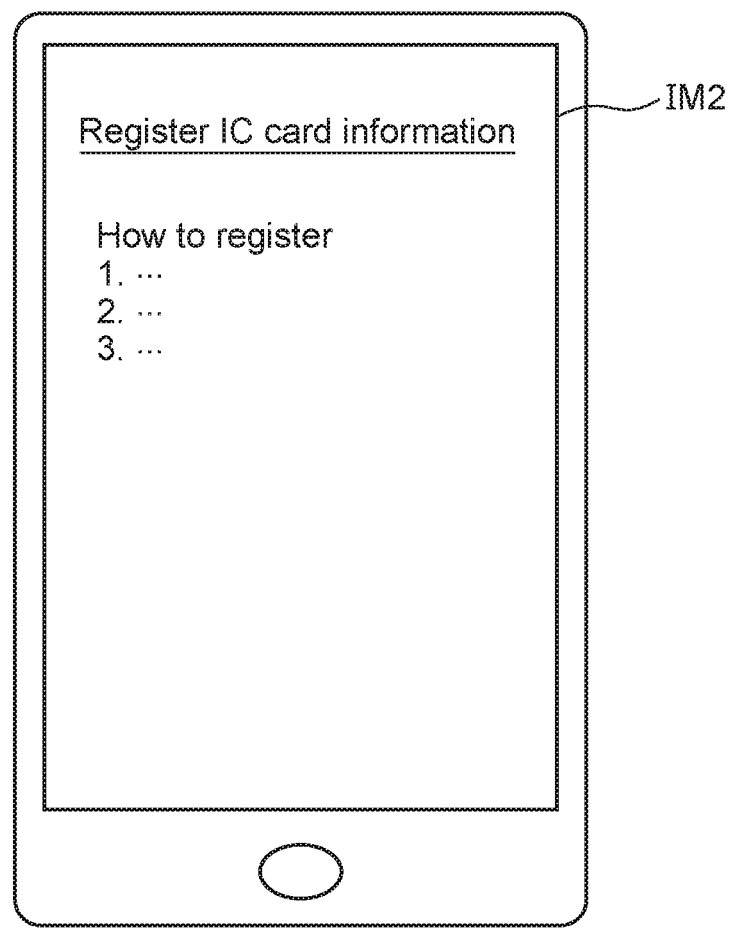
FIG. 10 is a diagram of an image of an explanation screen for registering IC card information according to the first embodiment of the invention.

FIG. 10 is a diagram of an image of an explanation screen for registering IC card information IM2 displayed by the authentication AP 122 on the display unit 113 according to the first embodiment of the invention. If the user holds the mobile terminal 110 over the mobile terminal detection area (not shown) of the MFP 140 and fails in the authentication, the image IM2 is displayed on the display unit 113.

Figure 11:
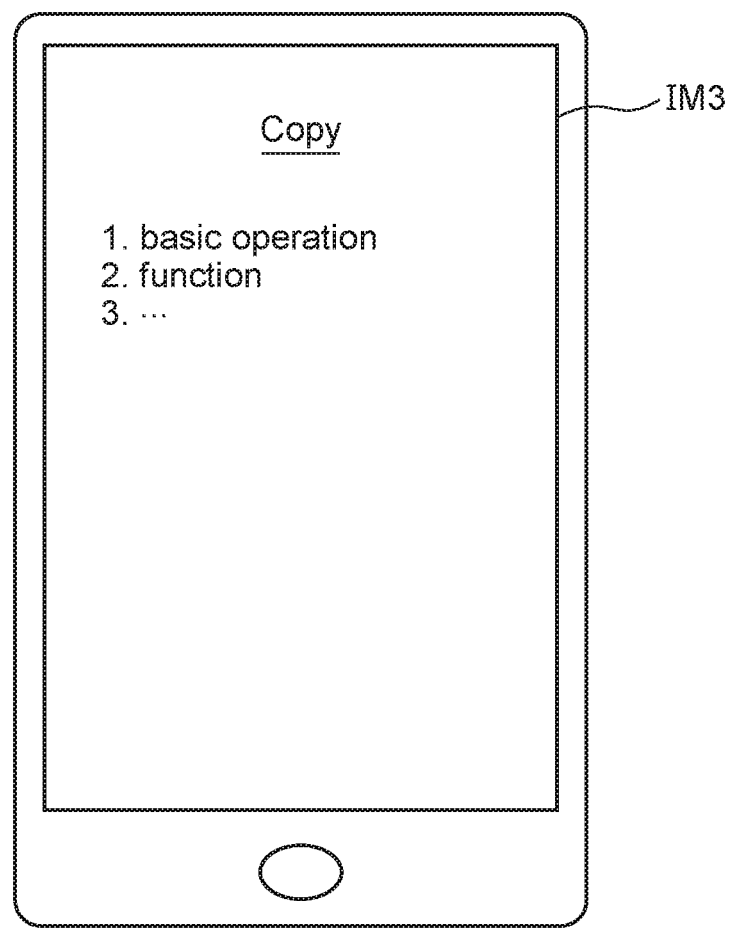
FIG. 11 is a diagram of a screen image for explaining the copy operation according to the first embodiment of the invention.

FIG. 11 is a diagram of a screen image for explaining a copy operation IM3 displayed by the operation guide AP 123 on the display unit 113 according to the first embodiment of the invention.

Figure 12:
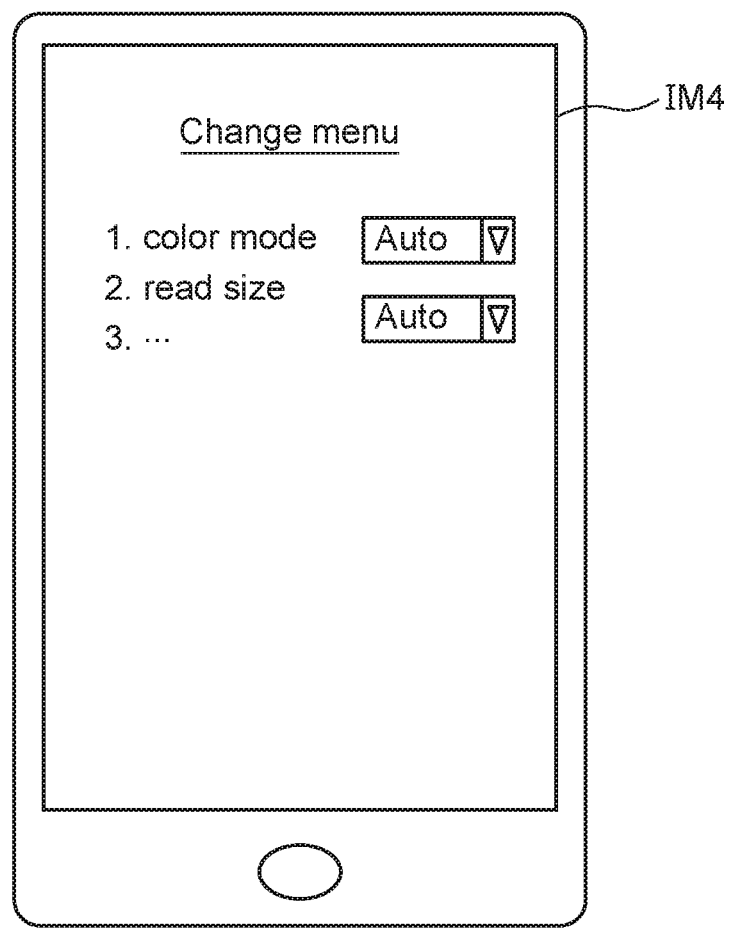
FIG. 12 is a diagram of an image of a screen for changing a menu according to the first embodiment of the invention.

FIG. 12 is a diagram of an image of a screen for changing a menu IM4 displayed by the operation guide AP 123 on the display unit 113 according to the first embodiment of the invention.

If the user holds the mobile terminal 110 over the mobile terminal detection area (not shown) of the MFP 140, the screen image for explaining the copy operation IM3 or the image of the screen for changing the menu IM4 is displayed according to the status of the MFP 140 at that time.

Figure 13A:
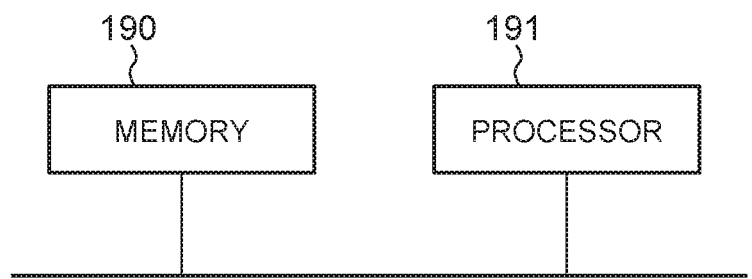
FIGS. 13A and 13B are diagrams illustrating of hardware.

For example, as shown in FIG. 13A, a part or the entire control unit 120 may be included a memory 190 and a processor 191 such as a CPU (Central Processing Unit) that executes a program stored in the memory 190. Such a program may be provided through a network, or may be provided by being recorded on a recording medium.

Figure 13B:
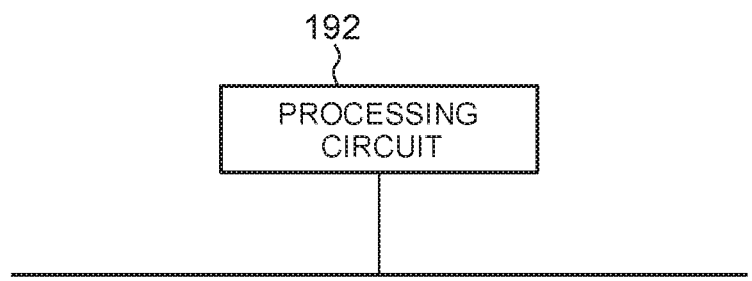

For example, as shown in FIG. 13B, a part or the entire of the control unit 120 may be included a single circuit, a composite circuit, a programmed processor, a parallel-programmed processor, a processing circuit 192 such as ASIC (Application Specific Integrated Circuits) or an FPGA (Field Programmable Gate Array).

Figure 14:
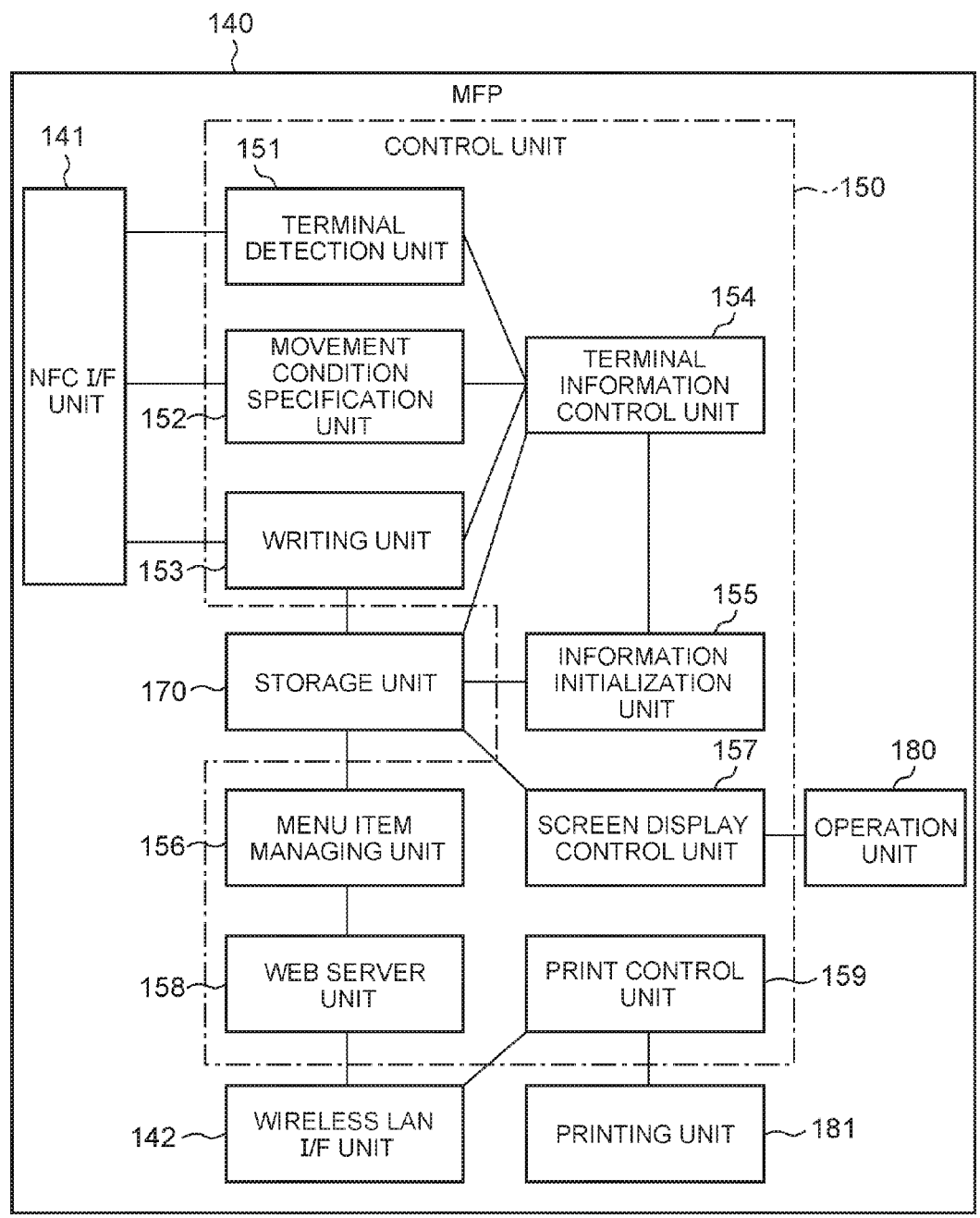
FIG. 14 is a diagram illustrating a configuration of a Multifunction Peripheral (MFP) according to the first embodiment of the invention.

FIG. 14 is a diagram illustrating a configuration of the MFP 140 according to the first embodiment of the invention.

The MFP 140 includes an NFC I/F unit 141, a wireless LAN I/F unit 142, a control unit 150, a storage unit 170, an operation unit 180, and a printing unit 181.

The control unit 150 controls processing in the MFP 140. For example, the control unit 150 changes information to be transmitted to the MFP 140 via the NFC I/F unit 141 according to the status of the MFP 140.

The control unit 150 includes a terminal detection unit 151, a movement condition specification unit 152, a writing unit 153, a terminal information control unit 154, an information initialization unit 155, a menu item managing unit 156, a screen display control unit 157, a web server unit 158, and a print control unit 159.

The terminal detection unit 151 is a detection unit that detects whether or not the mobile terminal 110 is within a predetermined range from the MFP 140. For example, the terminal detection unit 151 detects via the NFC I/F unit 141 that the mobile terminal 110 is held over a card and terminal detection area (not shown) of the MFP 140.

If the terminal detection unit 151 detects that the mobile terminal 110 is within the predetermined range from the MFP 140, the movement condition specification unit 152 accesses the mobile terminal 110 via the NFC I/F unit 141, specifies the status of the mobile terminal 110 and acquires the status. For example, the movement condition specification unit 152 reads information in the mobile terminal 110 via the NFC I/F unit 141 and specifies the operation status of the AP in the mobile terminal 110. Specifically, the movement condition specification unit 152 specifies an AP displayed on the foreground of the display unit 113 of the mobile terminal 110. The movement condition specification unit 152 is also referred to as a first acquiring unit.

The writing unit 153 transmits information corresponding to the status of the mobile terminal 110 and the status of the MFP 140 to the mobile terminal 110 via the NFC I/F unit 141. Information corresponding to the status of the mobile terminal 110 is also referred to as first apparatus status information, and information corresponding to the status of the MFP 140 is also referred to as second apparatus state information. The writing unit 153 writes information into the mobile terminal 110 via the NFC I/F unit 141. The writing unit 153 refers to information for managing the status in the MFP 140 stored in the storage unit 170. Specifically, the writing unit 153 specifies and acquires a screen image displayed on the operation unit 180 of the MFP 140. Then, the writing unit 153 writes the specified screen image and information corresponding to the operation status of the AP (AP displayed on the foreground) specified by the movement condition specification unit 152 in the NDEF message area 130 via the NFC I/F unit 141. As described above, the writing unit 153 has a role as a transmitting unit that transmits information, an acquiring unit that specifies and acquires information, and a writing unit that writes information. The writing unit 153 is also referred to as a second acquiring unit.

The terminal information control unit 154 controls the terminal detection unit 151, the movement condition specification unit 152, and the writing unit 153.

The information initialization unit 155 initializes information of the storage unit 170.

The menu item managing unit 156 changes various parameter (menu) items in the MFP 140 with reference to information of the storage unit 170.

The screen display control unit 157 controls the operation unit 180 that realizes the UI with the user. The screen display control unit 157 refers to information of the storage unit 170 or writes information in the storage unit 170 according to an instruction or the like from the user input to the operation unit 180.

The Web server unit 158 provides a Web page via the wireless LAN I/F unit 142. For example, the menu item managing unit 156 is accessed through a Web page provided by the Web server unit 158. By using this Web page, the user can change various menu items in the MFP 140. Since the Web server unit 158 is controllable from the wireless LAN I/F unit 142, the user can refer to the web page in the MFP 140 using the wireless LAN without connecting the wired LAN.

When the wireless LAN I/F receives the print data (image forming data), the print control unit 159 functions as an image forming control unit that causes the print unit 181 to output the printed matter (image formed item) by transferring the print data to the printing unit 181.

The storage unit 170 stores information necessary for processing in the MFP 140.

Figure 15:
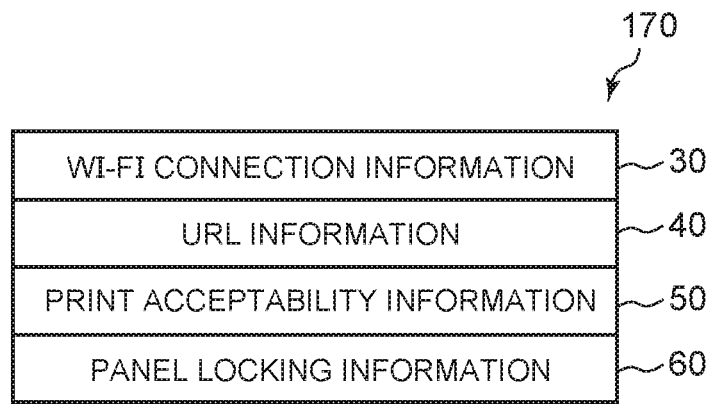
FIG. 15 is a diagram illustrating information stored in the storage unit according to the first embodiment of the invention.

FIG. 15 is a diagram illustrating information stored in the storage unit 170 according to the first embodiment of the invention.

The storage unit 170 stores Wi-Fi connection information 30, URL information 40, print acceptability information 50, and panel locking information 60.

Wi-Fi connection information 30 is information necessary for communicating with the MFP 140 by Wi-Fi Direct.

Figure 16:
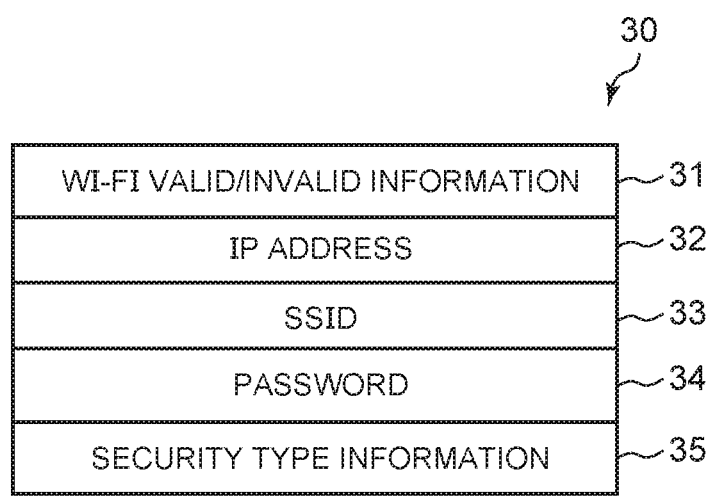
FIG. 16 is a diagram illustrating an internal structure of Wi-Fi connection information according to the first embodiment of the invention.

FIG. 16 is a diagram illustrating an internal structure of Wi-Fi connection information 30 according to the first embodiment of the invention.

Wi-Fi connection information 30 includes Wi-Fi valid/invalid information 31, an IP address 32, an SSID 33, a password 34, and security type information 35.

Wi-Fi valid/invalid information 31 indicates whether Wi-Fi is in a valid status, in other words, whether Wi-Fi Direct can connect to the MFP 140.

The IP address 32 is an IP address for connecting to the MFP 140 by Wi-Fi direct.

The SSID 33 is an SSID (Service Set IDentifier) for connecting to the MFP 140 by Wi-Fi Direct.

The password 34 is a password for connecting to the MFP 140 by Wi-Fi direct.

Security type information 35 indicates security types such as WEP (Wired Equivalent Privacy) and WPA (Wi-Fi Protected Access), which are used when connecting to the MFP 140 by Wi-Fi Direct.

Returning to FIG. 15, URL information 40 includes the URL of the Web page displayed on the mobile terminal 110.

Figure 17:
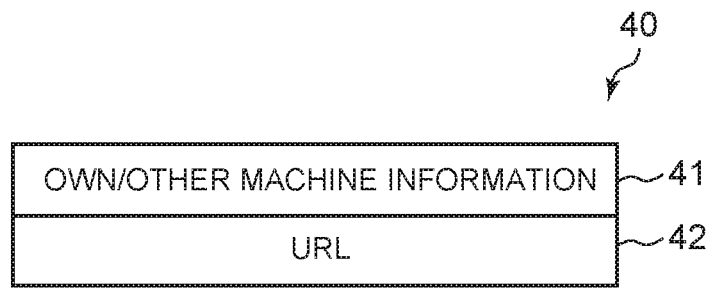
FIG. 17 is a diagram illustrating a content structure of URL information according to the first embodiment of the invention.

FIG. 17 is a diagram illustrating a content structure of URL information 40 according to the first embodiment of the invention.

URL information 40 includes a URL 42 of a Web page to be displayed on the mobile terminal 110 and own/other machine information 41 distinguishing whether or not URL 42 is a URL of a Web page provided by the Web server unit 158 of the own machine.

Returning to FIG. 15, print acceptability information 50 is image formation acceptability information indicating whether or not the MFP 140 can accept printing. For example, if print acceptability information 50 is "0", printing is unacceptable, and if it is "1", printing is acceptable.

The panel locking information 60 indicates whether or not a panel lock screen image is being displayed on the operation unit 180. For example, if the panel locking information 60 is "1", this indicates that the panel lock screen image is displayed on the operation unit 180, and if the panel locking information 60 is "0", this indicates that the panel lock screen image is not displayed on the operation unit 180.

Returning to FIG. 14, the storage unit 170 further stores an AID definition table. The AID definition table stored in the storage unit 170 is managed by the terminal information control unit 154.

Figure 18:
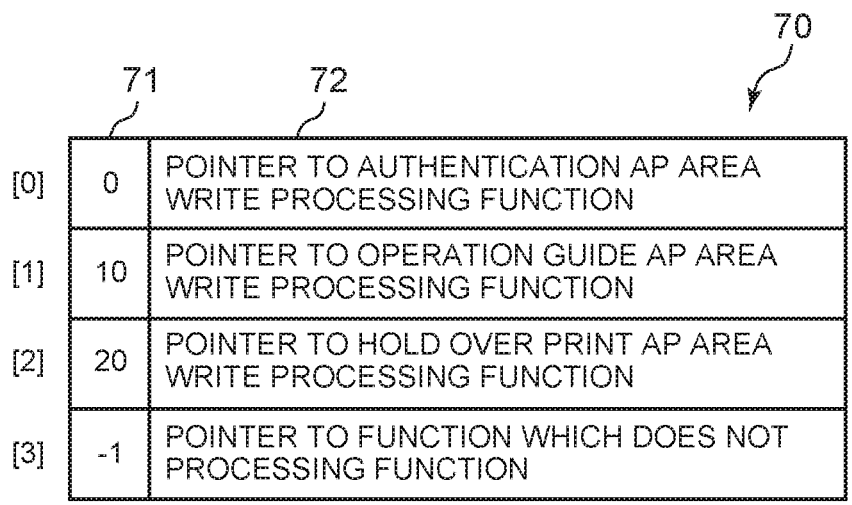
FIG. 18 is a diagram illustrating an Application ID (AID) definition table of the MFP according to the first embodiment of the invention.

FIG. 18 is a diagram illustrating the AID definition table 70 stored in the storage unit 170 according to the first embodiment of the invention.

The AID definition table 70 has an AID column 71 and a pointer column 72.

The AID column 71 stores the AID for each AP so that it completely matches the AID defined in the AID definition table 20 managed by the mobile terminal 110.

The pointer column 72 stores a pointer indicating which write processing function should be executed for each AID.

Returning to FIG. 14, the operation unit 180 realizes a user interface with the user. For example, the operation unit 180 can be realized by an operation panel including an input unit and a display unit (second display unit).

Figure 19:
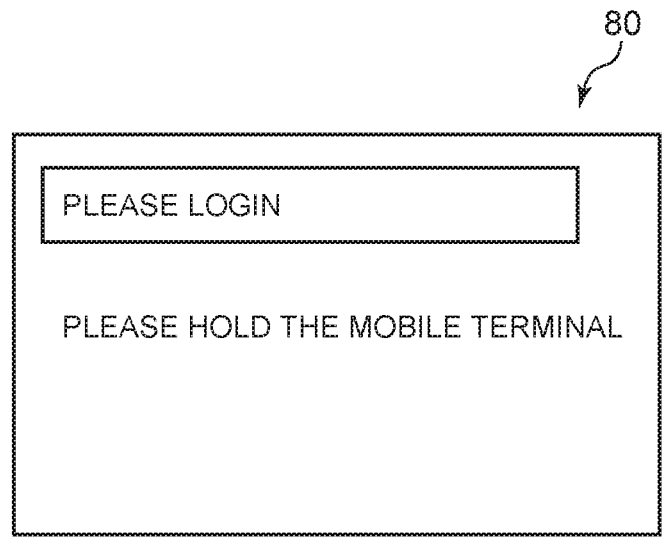
FIG. 19 is a diagram of a panel lock screen image according to the first embodiment of the invention.

FIG. 19 is a diagram illustrating the panel lock screen image 80 displayed on the operation unit 180 while the panel is locked according to the first embodiment of the invention. If the panel lock screen image 80 is displayed on the operation unit 180, "1" is set in panel locking information 60 and "0" is set in print acceptability information 50.

Figure 20:
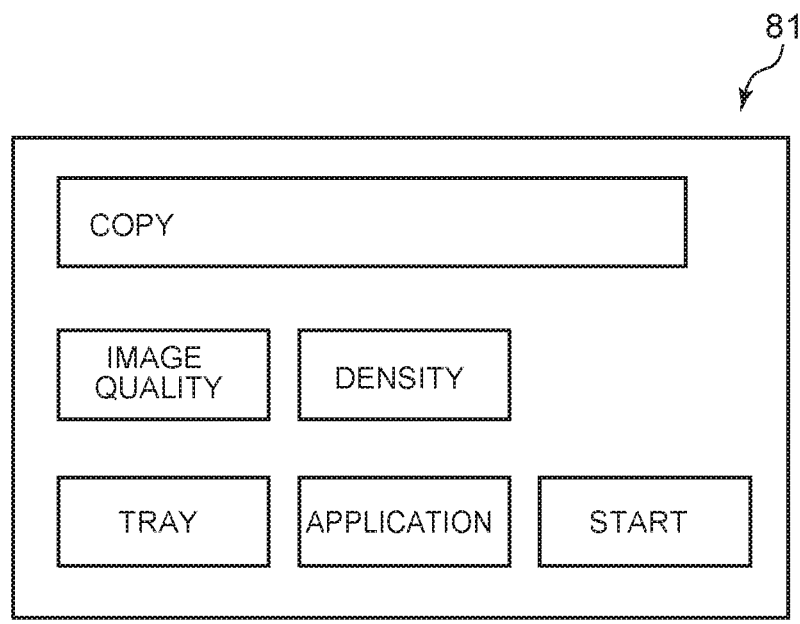
FIG. 20 is a diagram of an image of a copy standby screen according to the first embodiment of the invention.

FIG. 20 is a diagram illustrating the copy standby screen image 81 displayed on the operation unit 180 according to the first embodiment of the invention. If the panel lock is canceled and the user desires to execute the copy, the copy standby screen image 81 is displayed on the operation unit 180 by an operation (not shown). If the copy standby screen image 81 is displayed on the operation unit 180, the MFP 140 can execute copying, and can also receive and print the print data remotely from a host PC (not shown). Therefore, the copy standby screen image 81 can also be said to be the image formation execution standby screen image. If the copy standby screen image 81 is displayed on the operation unit 180, "1" is set in print acceptability information 50.

Figure 21:
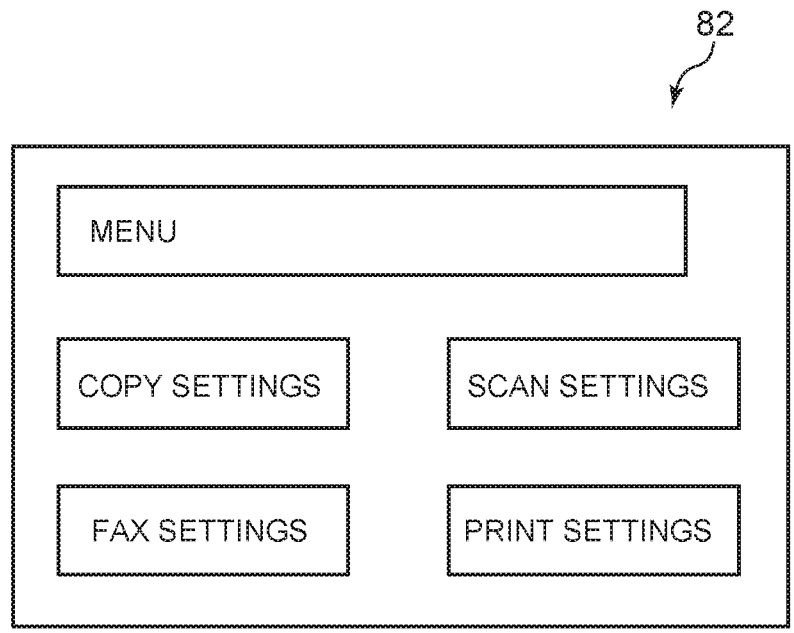
FIG. 21 is a diagram of an image of a screen for changing the menu setting according to the first embodiment of the invention.

FIG. 21 is a diagram illustrating the menu setting change screen image 82 displayed on the operation unit 180 according to the first embodiment of the invention. If the panel lock is canceled and the user desires to change the menu setting, the menu setting change screen image 82 is displayed on the operation unit 180 by an operation (not shown). In the first embodiment, if the menu setting change screen image 82 is displayed on the operation unit 180, print data cannot be received remotely from a host PC (not shown). Therefore, if the menu setting change screen image 82 is displayed on the operation unit 180, "0" is set in print acceptability information 50.

The printing unit 181 is an image forming unit that performs printing (image formation) on a medium such as paper in accordance with an instruction from the print control unit 159.

For example, as shown in FIG. 13A, a part or the entire control unit 150 may be included a memory 190 and a processor 191 such as a CPU that executes a program stored in the memory 190. Such a program may be provided through a network, or may be provided by being recorded on a recording medium.

For example, as shown in FIG. 13B, a part or the entire of the control unit 150 may be included a single circuit, a composite circuit, a programmed processor, a parallel-programmed processor, a processing circuit 192 such as ASIC or an FPGA.

Figure 23:
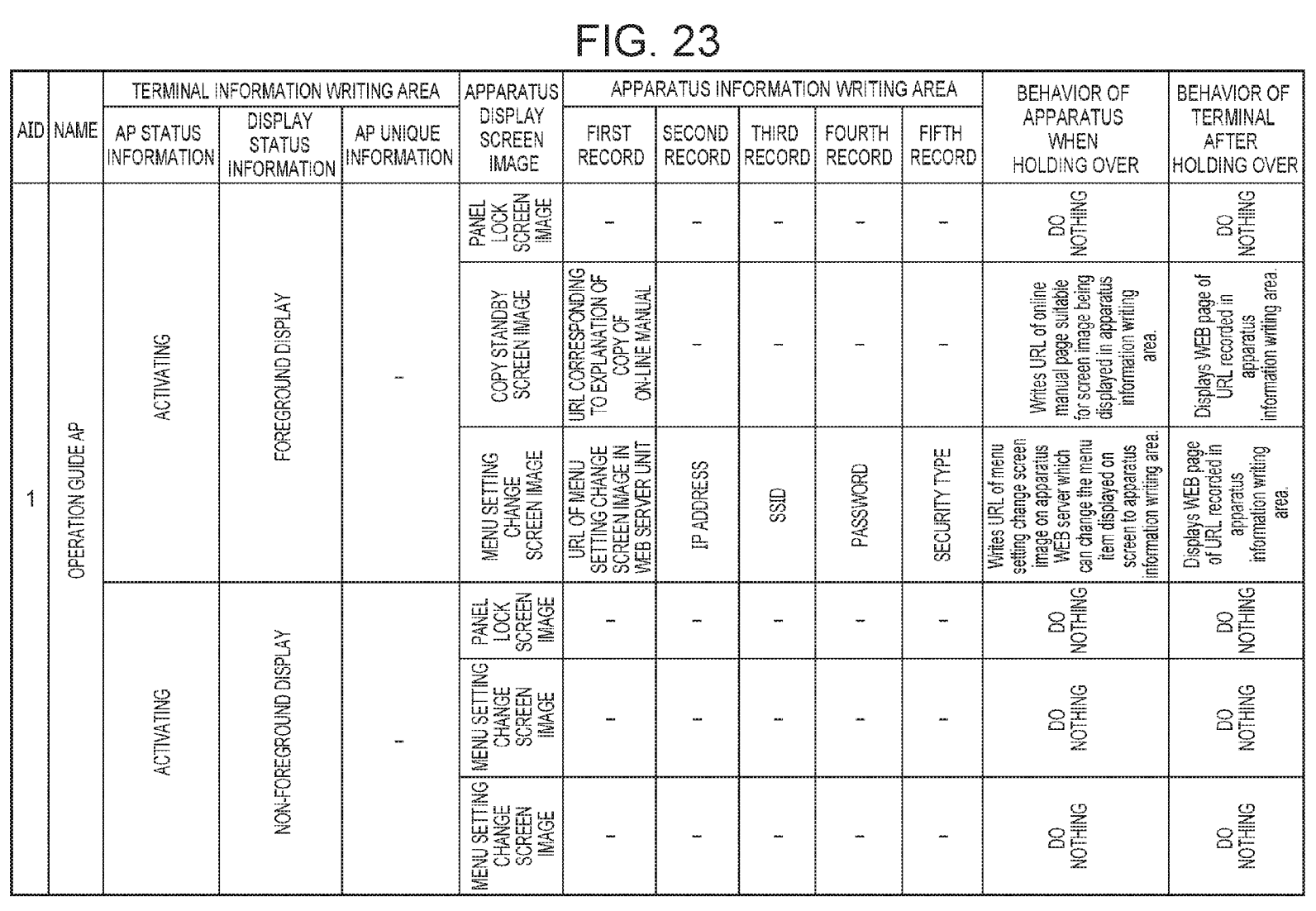

FIGS. 22 to 24 are operation matrices according to respective status between the mobile terminal 110 and the MFP 140 in order to make it easy to understand the behavior in the first embodiment. That is, the MFP 140 changes the predetermined behavior based on apparatus status information acquired by the first acquiring unit and the second acquiring unit. The operation flow for realizing behavior described in this operation matrix will be described below.

The operation in the first embodiment will be described with reference to the drawings.

Figure 25:
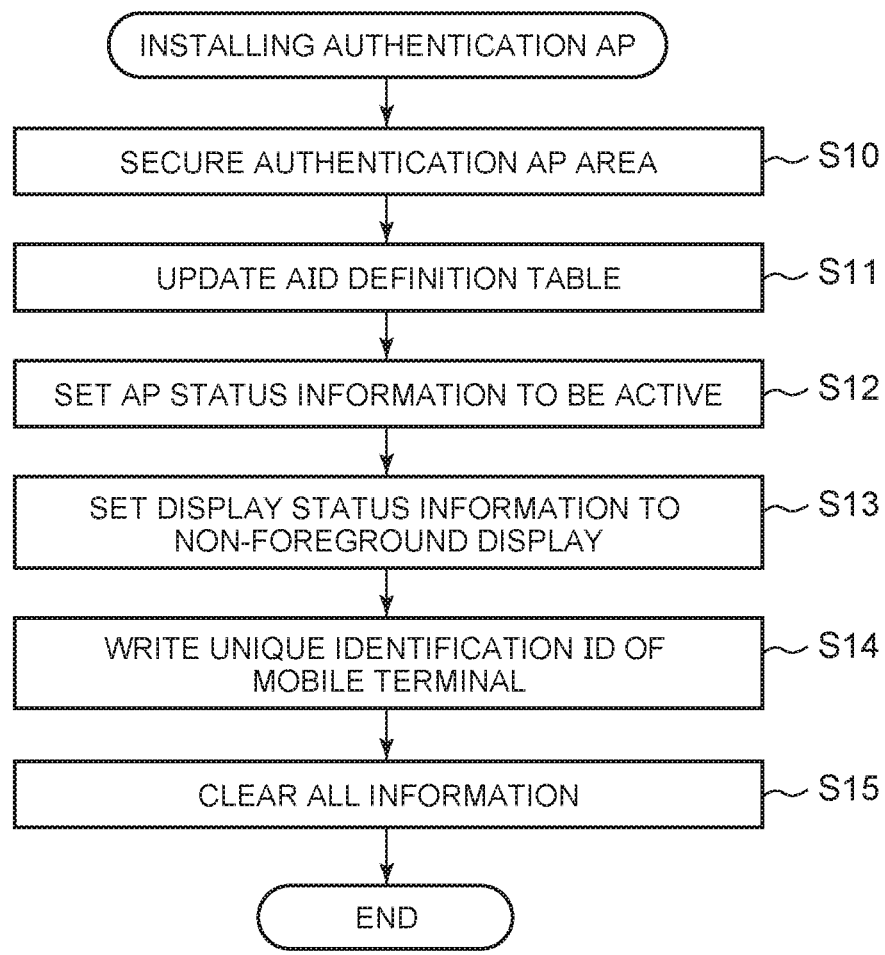
FIG. 25 is a flowchart illustrating processing in which an AP control unit installs an authentication AP according to the first embodiment of the invention.

FIG. 25 is a flowchart illustrating processing in which an AP control unit 121 installs an authentication AP 122 in the mobile terminal 110 according to the first embodiment of the invention.

When the input unit 114 receives a request to install the authentication AP 122 from the user to the mobile terminal 110, the AP control unit 121 secures the authentication AP area 131 in the NDEF message area 130 (S10).

Next, the AP control unit 121 sets the address to the secured authentication AP area 131 and the AID previously embedded in the installed authentication AP 122 in the AID definition table 20 (S11).

Thereafter, in the authentication AP area 131, the AP control unit 121 writes "1" indicating that it is activating as AP status information 13 of the terminal information writing area 11 (S12). Unlike other AP, the authentication AP 122 does not require an explicit activate operation by the user, so information indicating that the authentication AP 122 is active at the time of installation is written.

Next, in the authentication AP area 131, the AP control unit 121 writes "0" indicating the non-foreground display as display status information 14 of the terminal information writing area 11 (S13). Next, in the authentication AP area 131, the AP control unit 121 writes the unique identification ID of the mobile terminal 110 in the first record 15a of AP unique information 15 of the terminal information writing area 11 (S14). In the first embodiment, the MAC address for Wi-Fi connection in the mobile terminal 110 is written.

Then, the AP control unit 121 clears all information in the apparatus information writing area 12 in the authentication AP area 131 (S15).

Figure 26:
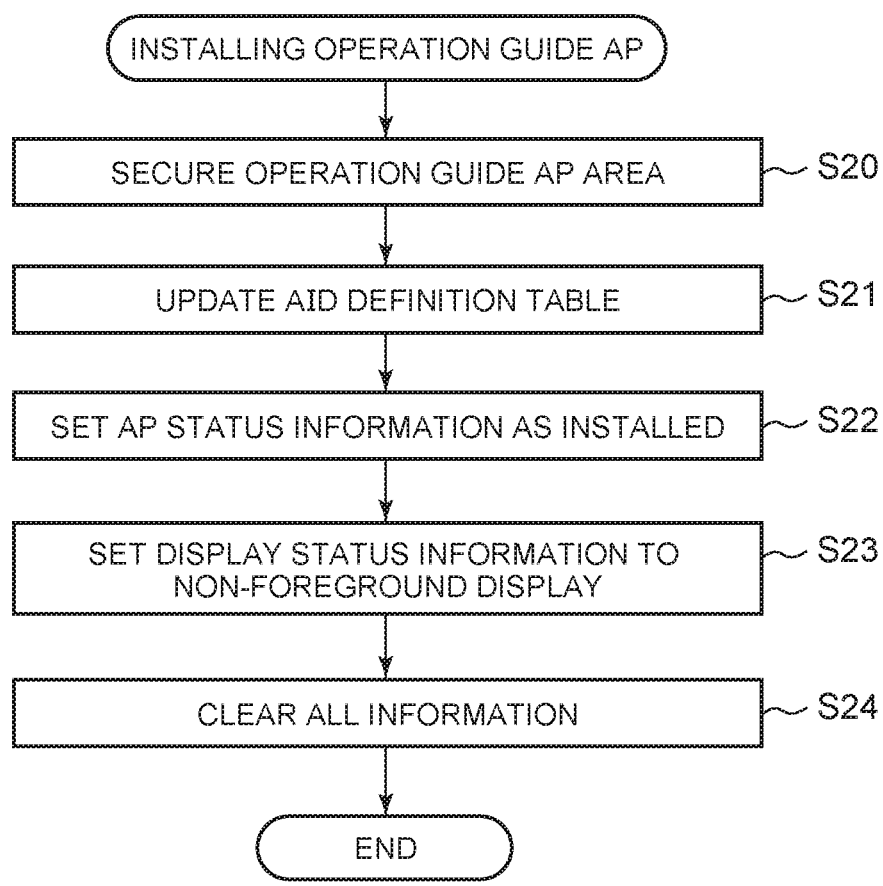
FIG. 26 is a flowchart illustrating processing in which the AP control unit installs an operation guide AP according to the first embodiment of the invention.

FIG. 26 is a flowchart illustrating processing in which the AP control unit 121 installs the operation guide AP 123 in the mobile terminal 110 according to the first embodiment of the invention.

When the input unit 114 receives a request to install the operation guide AP 123 to the mobile terminal 110 from the user, the AP control unit 121 secures the operation guide AP use area 132 in the NDEF message area 130 (S20).

Next, the AP control unit 121 sets the address to the secured operation guide AP area 132 and the AID previously embedded in the installed operation guide AP 123 in the AID definition table 20 (S21).

Thereafter, the AP control unit 121 writes "0" indicating that the operation guide AP has been installed as AP status information 13 of the terminal information writing area 11 in the operation guide AP area 132 (S22).

Next, the AP control unit 121 writes "0" indicating the non-foreground display as display status information 14 of the terminal information writing area 11 in the operation guide AP area 132 (S23).

Then, the AP control unit 121 clears all the information in the apparatus information writing area 12 in the operation guide AP area 132 (S24).

Figure 27:
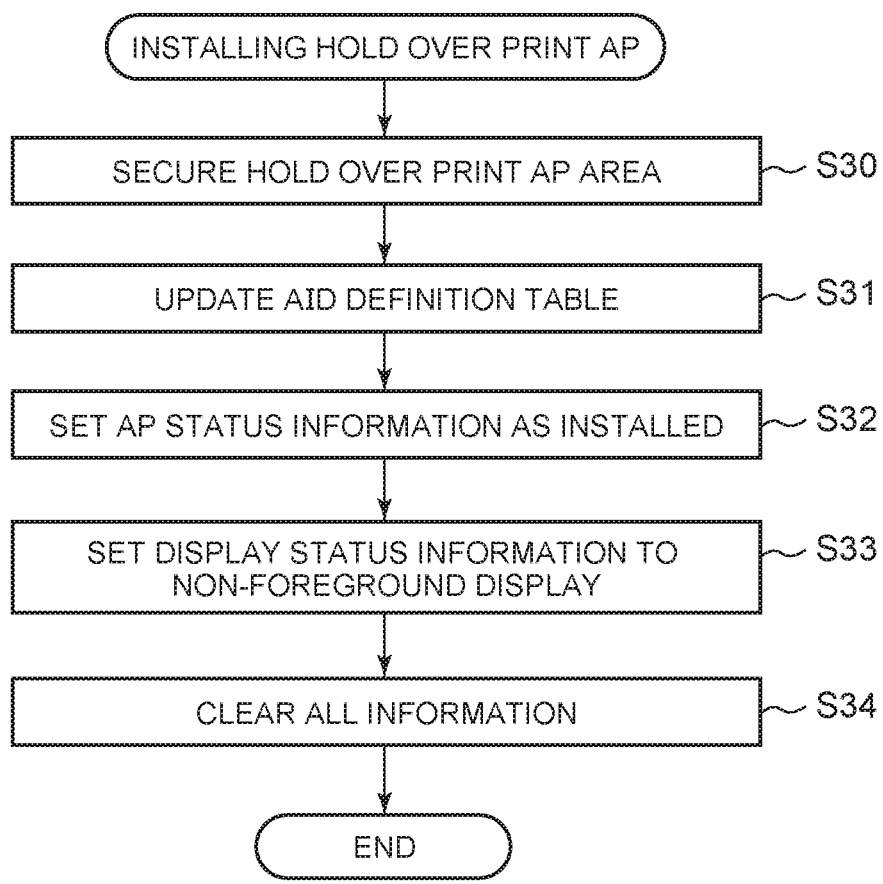
FIG. 27 is a flowchart illustrating processing in which the AP control unit installs a hold over print AP according to the first embodiment of the invention.

FIG. 27 is a flowchart illustrating processing in which the AP control unit 121 installs the hold over print AP 124 in the mobile terminal 110 according to the first embodiment of the invention.

When the input unit 114 receives from the user a request to install the hold over print AP 124 to the mobile terminal 110, the AP control unit 121 secures the hold over print AP area 133 (S30).

Next, the AP control unit 121 sets the address to the reserved hold over print AP area 133 and the AID previously embedded in the hold over print AP 124 by installing it in the AID definition table 20 (S31).

Thereafter, in the hold over print AP area 133, the AP control unit 121 writes "0" indicating that it is installed as AP status information 13 of the terminal information writing area 11 (S32).

Next, the AP control unit 121 writes "0" indicating the non-foreground display as display status information 14 of the terminal information writing area 11 in the hold over print AP area 133 (S33).

Then, the AP control unit 121 clears all the information in the apparatus information writing area 12 in the over hold print AP area 132 (S34).

Figure 28:
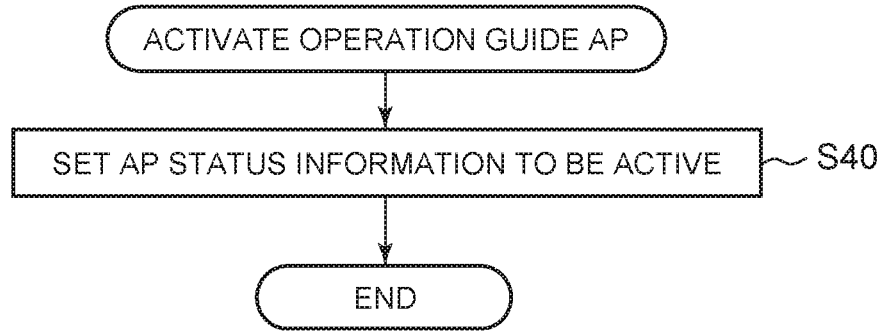
FIG. 28 is a flowchart illustrating processing performed by the AP control unit when the operation guide AP is activated by the user according to the first embodiment of the invention.

FIG. 28 is a flowchart illustrating processing performed by the AP control unit 121 when the operation guide AP 123 is activated by the user according to the first embodiment of the invention.

When the input unit 114 receives an activation instruction that selects the operation guide AP 123 from the user, the AP control unit 121 writes "1" indicating that it is activating as AP status information 13 of the terminal information writing area 11 in the operation guide AP area 132 (S40).

Figure 29:
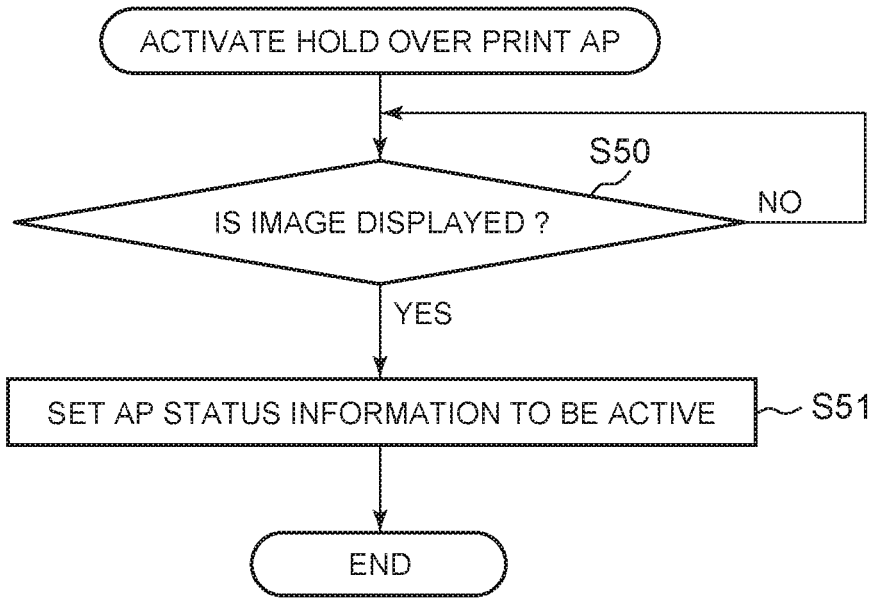
FIG. 29 is a flowchart illustrating processing performed by the AP control unit when the hold over print AP is activated by the user according to the first embodiment of the invention.

FIG. 29 is a flowchart illustrating processing performed by the AP control unit 121 when the hold over print AP 124 is activated by the user according to the first embodiment of the invention.

When the input unit 114 receives an activation instruction that selected the hold over print AP 124 from the user, the AP control unit 121 determines whether or not the user has caused the display unit 113 to display a desired print image (for example, the print image IM1) using the hold over print AP 124 via the input unit 114 (S50).

If the print image is displayed on the display unit 113 (Yes in S50), processing proceeds to step S51.

In step S51, the AP control unit 121 writes "1" indicating that it is activating as AP status information 13 of the terminal information writing area 11 in the hold over print AP area 133.

Figure 30:
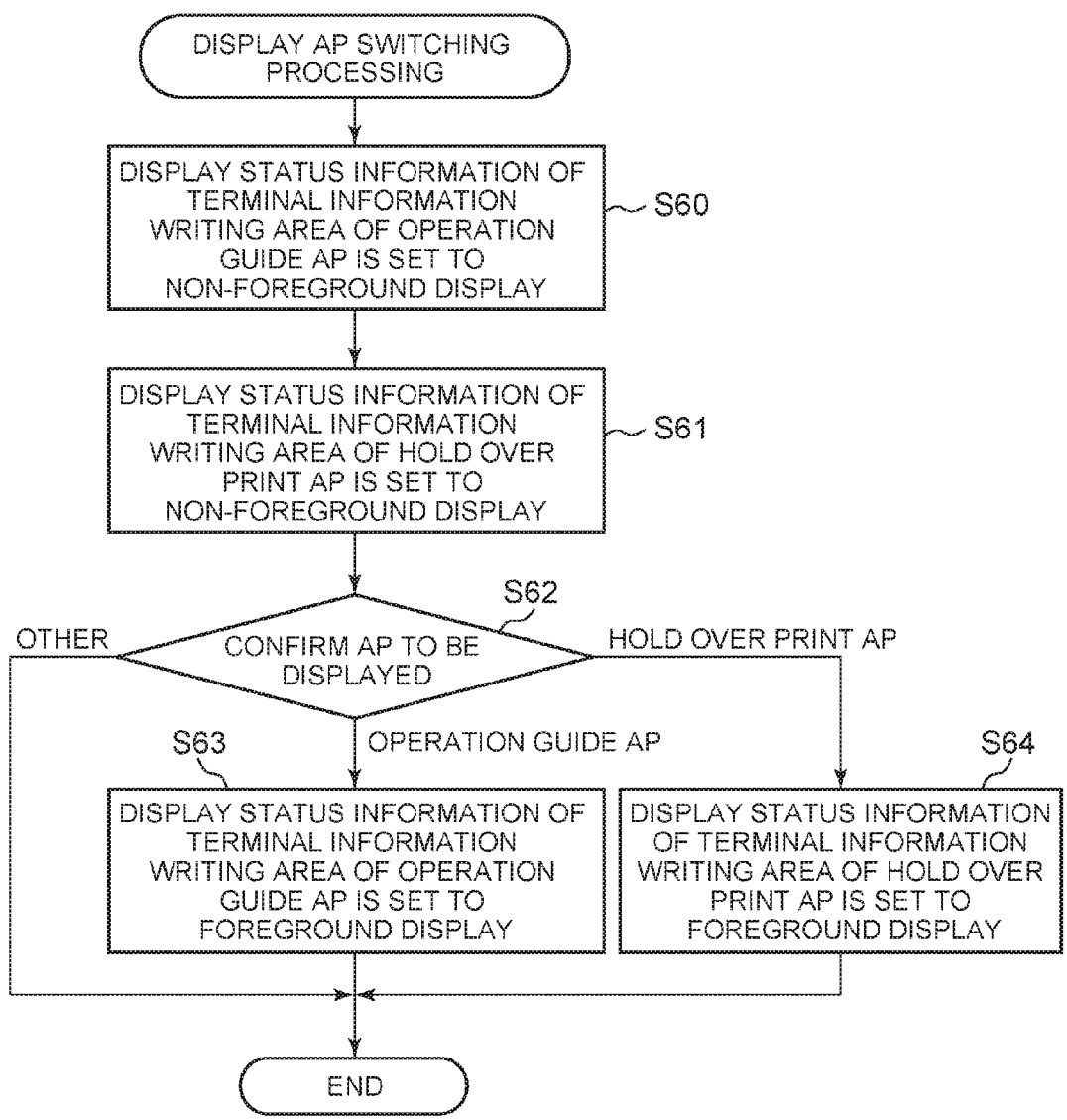
FIG. 30 is a flowchart illustrating display AP switching processing performed by the AP control unit according to the first embodiment of the invention.

FIG. 30 is a flowchart illustrating display AP switching processing performed by the AP control unit 121 according to the first embodiment of the invention.

This processing is executed every time the AP is switched to be displayed on the display unit 113 of the mobile terminal 110.

In the operation guide AP area 132, the AP control unit 121 writes "0" indicating non-foreground display as display status information 14 of the terminal information writing area 11 (S60).

In the hold over print AP area 133, the AP control unit 121 writes "0" indicating non-foreground display as display status information 14 of the terminal information writing area 11 (S61).

Next, the AP control unit 121 confirms the AP to be displayed on the foreground (S62). For example, the AP control unit 121 may specify the AP to be displayed on the foreground from the OS (Operating System) of the mobile terminal 110.

Specifically, when the mobile terminal 110 equipped with an android as the OS, the AP control unit 121 can confirm the AP to be displayed at the foreground in the following first to fifth methods.

In the first method, the AP control unit 121 can specify display or non-display for each screen by confirming the life cycle of the activity created by the android.

Android is notified of the event for each activity. For display, an event of "OnResume" is notified, and for non-display, an event of "Onpause" is notified. Therefore, in the second method, the AP control unit 121 can specify display or non-display by confirming the notified event.

Activities created by android transfer received events to a program called service that recognizes the status of all activities. Therefore, in the third method, a program called this service is incorporated in the mobile terminal 110, and the AP control unit 121 specifies display or non-display by notifying the transferred control event to the AP control unit 121.

The above-mentioned service program can recognize all screen transition events of necessary activities. Therefore, in the fourth method, by acquiring such a screen transition event from the service, the AP control unit 121 can recognize which activity is displayed every time the screen transition is switched.

In the fifth method, the AP control unit 121 can recognize the AP displayed at the foreground by holding the information of which AP is part of the activity itself.

If the AP displayed on the foreground is the operation guide AP 123, the AP control unit 121 writes "1" indicating foreground display as display status information 14 of the terminal information writing area 11 in the operation guide AP area 132 (S63).

If the AP displayed on the foreground is the hold over print AP 124, the AP control unit 121 writes "1" indicating foreground display as display status information 14 of the terminal information writing area 11 in the hold over print AP area 133 (S64).

If the AP displayed on the foreground is not the operation guide AP 123 and the hold over print AP 124, the AP control unit 121 ends the process without doing anything.

As described above, when the mobile terminal 110 is held over the MFP 140 in a status where the AP is displayed on the display unit 113 of the mobile terminal 110, specific processing is performed by at least one of the mobile terminal 110 and the MFP 140 according to the display status (AP operation state) of the mobile terminal 110 and the status of the MFP 140.

Next, the operation of the MFP 140 will be described.

Figure 31:
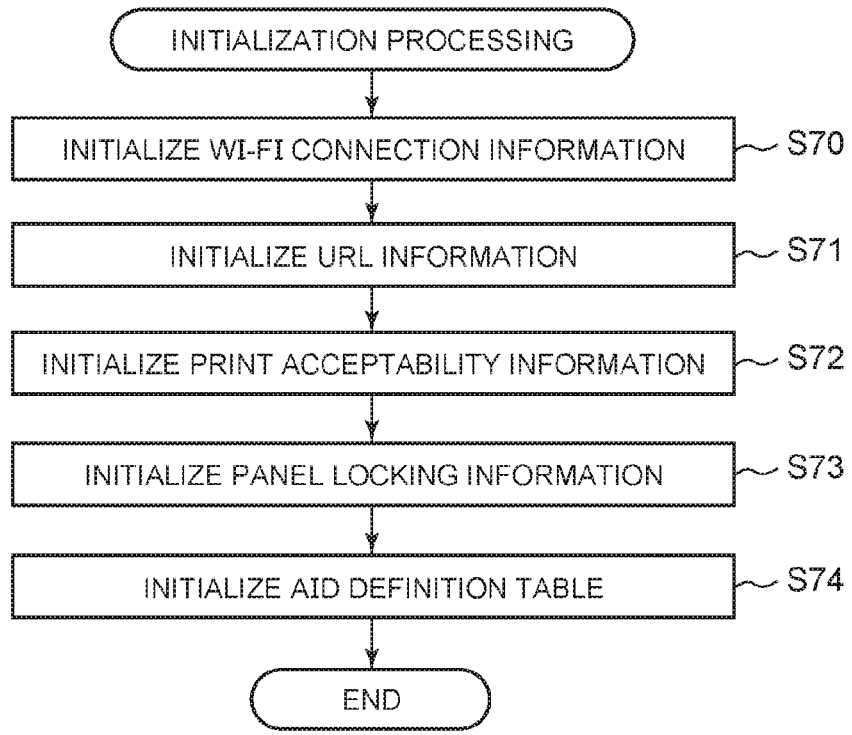
FIG. 31 is a flowchart illustrating initialization processing performed by an information initialization unit of the MFP at power-on or the like according to the first embodiment of the invention.

FIG. 31 is a flowchart illustrating initialization processing performed by an information initialization unit 155 of the MFP 140 at power-on or the like according to the first embodiment of the invention.

The information initialization unit 155 initializes Wi-Fi connection information 30 managed by the storage unit 170 (S70). Specifically, the information initialization unit 155 sets "0" indicating that the Wi-Fi connection is invalid as Wi-Fi valid/invalid information 31 in Wi-Fi connection information 30. Then, the information initialization unit 155 sets "0" or a blank character column indicating that all of them are not set as the other IP address 32, an SSID 33, a password 34 and security type information 35.

Next, the information initializing unit 155 initializes URL information 40 (S71). Specifically, in URL information 40, the information initialization unit 155 sets "0" indicating own machine as own/other machine information 41 and sets an empty character column as the URL 42.

Next, the information initialization unit 155 initializes print acceptability information 50 (S72). Specifically, the information initialization unit 155 sets "0" indicating that print acceptance is impossible as print acceptability information 50.

Next, the information initializing unit 155 initializes panel locking information 60 (S73). Specifically, the information initializing unit 155 sets "0" indicating that the panel lock screen image is not being displayed as panel locking information 60.

Next, the information initialization unit 155 initializes the contents of the AID definition table 70 (S74). Specifically, the information initialization unit 155 stores "0" in the AID column 71 of the record of the table index 0. Then, the information initialization unit 155 sets "a pointer to the authentication AP area write processing function" in the pointer column 72. Also, the information initialization unit 155 stores "10" in the AID column 71 of the record of the table index 1. Then, the information initialization unit 155 sets "a pointer to an operation guide AP area write processing function" in the pointer column 72. Also, the information initialization unit 155 stores "20" in the AID column 71 of the record of the table index 2. Then, the information initialization unit 155 sets "a pointer to a hold over print AP area write processing function" in the pointer column 72.

In addition, the information initialization unit 155 sets "−1" indicating that the table is the end in the AID column 71 of the record of the table index 3.

Figure 32:
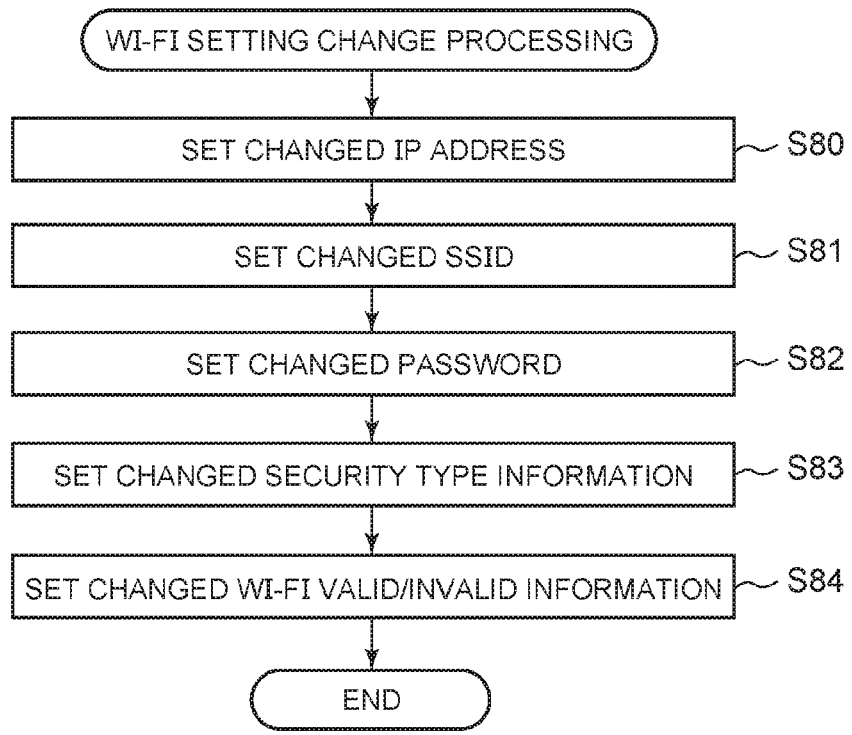
FIG. 32 is a flowchart illustrating Wi-Fi setting change processing performed by a menu item managing unit of the MFP according to the first embodiment of the invention.

FIG. 32 is a flowchart illustrating Wi-Fi setting change processing performed by a menu item managing unit 156 of the MFP 140 according to the first embodiment of the invention.

When the user changes the menu related to the Wi-Fi setting by means not shown, this flow is started.

When this flow is started, the menu item managing unit 156 sets the changed IP address as the IP address 32 in Wi-Fi connection information 30 stored in the storage unit 170 (S80).

In Wi-Fi connection information 30, the menu item managing unit 156 sets the changed value as the SSID 33, sets the changed value as the password 34, and sets the changed value as security type information 35 (S81 to S83).

Then, in Wi-Fi connection information 30, the menu item managing unit 156 sets the updated latest value as Wi-Fi valid/invalid information 31 (S84).

Figure 33:
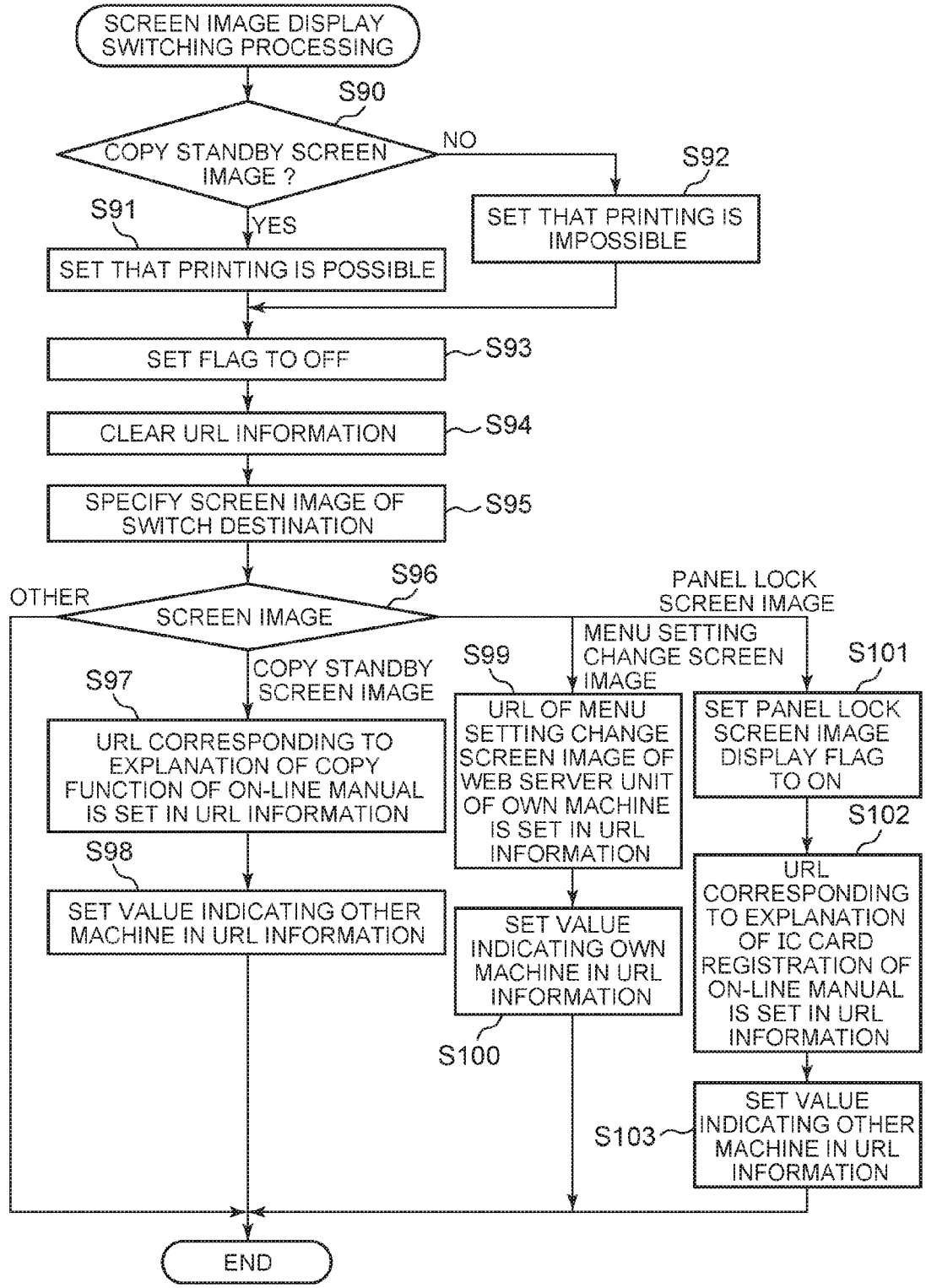
FIG. 33 is a flowchart illustrating screen image display switching processing performed by the screen display control unit of the MFP according to the first embodiment of the invention.

FIG. 33 is a flowchart illustrating screen image display switching processing performed by the screen display control unit 157 of the MFP 140 according to the first embodiment of the invention.

This flow is executed each time the screen image displayed on the operation unit 180 is switched.

The screen display control unit 157 confirms whether or not the image displayed on the operation unit 180 is a copy standby screen image (S90). If it is a copy standby screen image (Yes in S90), processing proceeds to step S91. If it is not a copy standby screen image (No in S90), processing proceeds to step S92.

In step S91, the screen display control unit 157 sets "1" indicating that print acceptance is possible as print acceptability information 50 stored in the storage unit 170. Then, processing proceeds to step S93.

On the other hand, in step S92, the screen display control unit 157 sets "0" indicating that print acceptance is impossible as print acceptability information 50 stored in the storage unit 170. Then, processing proceeds to step S93.

In step S93, the screen display control unit 157 sets "0" indicating that the panel lock screen image is not being displayed as panel locking information 60 stored in the storage unit 170.

Next, the screen display control unit 157 clears URL information 40 stored in the storage unit 170 (S94). Specifically, in URL information 40, the screen display control unit 157 sets "0" indicating the own machine as own/other machine information 41 and sets an empty character column as the URL 42.

The screen display control unit 157 specifies the next screen image to be displayed on the operation unit 180 (S95).

If the screen image to be displayed is the copy standby screen image 81 (S96), the screen display control unit 157 sets the URL corresponding to the web page that explains the copy function of the on-line manual published on the Internet. In other words, the screen display control unit 157 sets the URL for displaying the screen image for explaining the copy operation IM3 as the URL 42 (S97).

Further, the screen display control unit 157 sets "1" indicating the other machine as own/other machine information 41 (S98).

If the screen image to be displayed is the menu setting change screen image 82 (S96), the screen display control unit 157 sets the URL corresponding to the web page provided by the web server unit 158 of the own machine. In other words, the screen display control unit 157 sets the URL for displaying the image of a screen for changing a menu IM4 as the URL 42 (S99).

Further, the screen display control unit 157 sets "0" indicating own machine as own/other machine information 41 (S100).

If the screen image to be displayed is the panel lock screen image 80 (S96), the screen display control unit 157 sets "1" indicating that the panel is locked as the panel locking information 60 (S101).

Further, the screen display control unit 157 sets the URL corresponding to the web page that explains the registration of the IC card of the on-line manual published on the Internet. In other words, the screen display control unit 157 sets the URL for displaying the image of the explanation screen for registering IC card information IM2 as the URL 42 (S102).

Further, the screen display control unit 157 sets "1" indicating other machine as own/other machine information 41 (S103).

If the screen image to be displayed is not the copy standby screen image 81, the menu setting change screen image 82, and the panel lock screen image 80 (S96), the screen display control unit 157 ends processing without doing anything.

Figure 34:
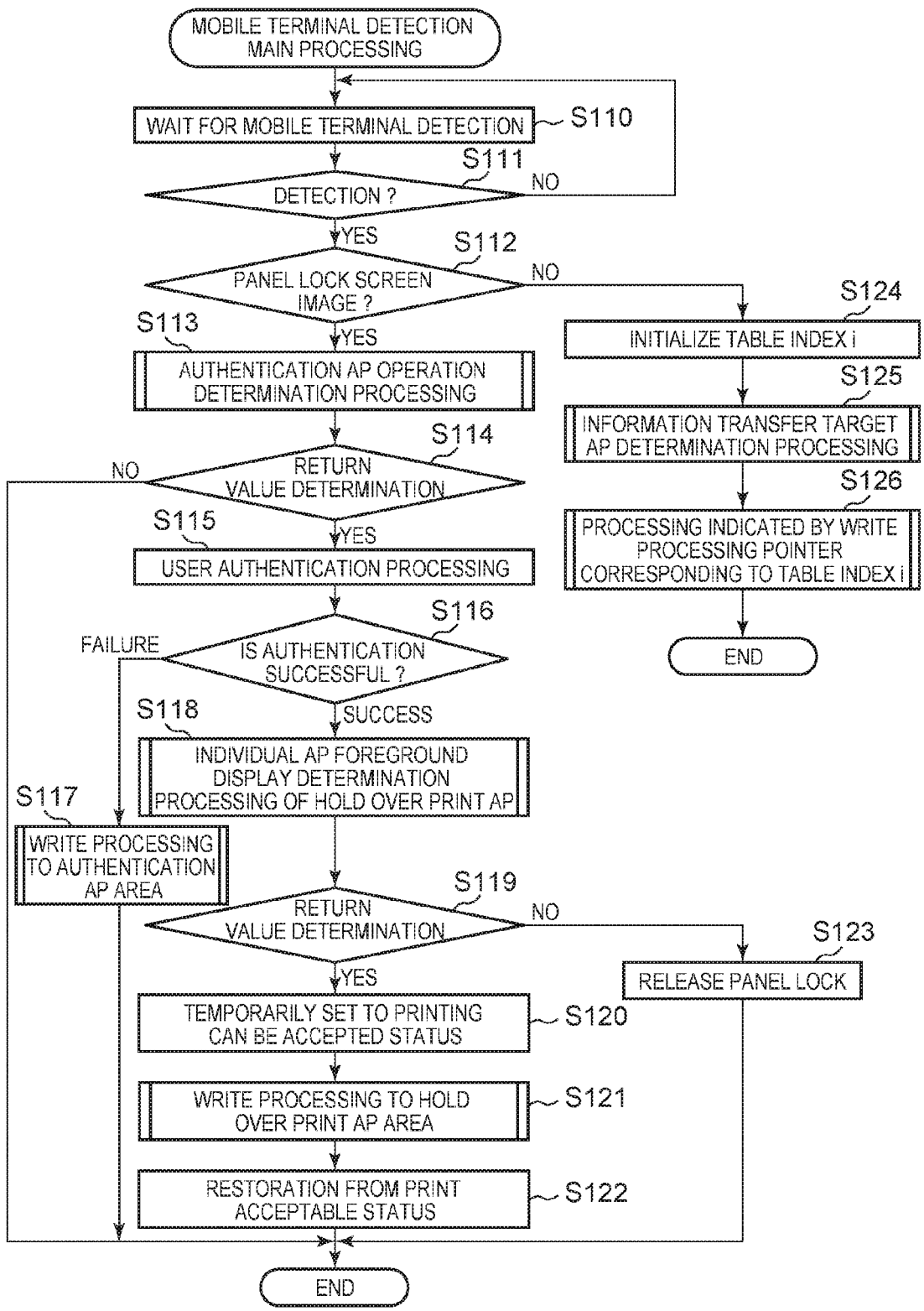
FIG. 34 is a flowchart illustrating main processing performed by the terminal information control unit of the MFP according to the first embodiment of the invention.

FIG. 34 is a flowchart illustrating main processing performed by the terminal information control unit 154 of the MFP 140 according to the first embodiment of the invention.

The terminal information control unit 154 uses the terminal detection unit 151 and waits until the mobile terminal 110 is held over a card and a terminal detection area (not shown) of the MFP 140 (S110, S111). If the mobile terminal 110 is held (Yes in S111), processing proceeds to step S112.

In step S112, the terminal information control unit 154 determines whether or not the panel lock screen image 80 is displayed on the operation unit 180 by checking the value of panel locking information 60 stored in the storage unit 170. If the value of panel locking information 60 is "1 (panel locking)" (Yes in S112), processing proceeds to step S113. If the value of panel locking information 60 is "0 (non-panel locked)" (No in S112), processing proceeds to step S124.

In step S113, authentication AP operation determination processing to be described later is executed as subroutine processing.

Then, the terminal information control unit 154 determines the return value from authentication AP operation determination processing (S114). If the return value is NO, the terminal information control unit 154 ends processing without doing anything. If the return value is YES, processing proceeds to step S115.

In step S115, the terminal information control unit 154 performs user authentication processing. For example, the terminal information control unit 154 requests the user of the mobile terminal 110 to input a user name and a password, and determines whether or not the user name and password are stored in advance in the storage unit 170 or the like, and performs user authentication processing.

Then, the terminal information control unit 154 confirms the result of the user authentication processing (S116). If the user authentication fails, processing proceeds to step S117, and if the user authentication is successful, processing proceeds to step S118.

In step S117, write processing to the authentication AP area is executed as subroutine processing.

In step S118, the individual AP foreground display determination processing for the hold over print AP 124 is executed as a subroutine processing. The terminal information control unit 154 sets AID=20 indicating the hold over print AP as an argument.

Next, the terminal information control unit 154 determines the return value from individual AP foreground display determination processing (S119). If the return value is YES, processing proceeds to step S120. If the return value is NO, processing proceeds to step S123.

In step S120, the terminal information control unit 154 sets "1" indicating that print acceptance is possible as print acceptability information 50 so as to temporarily forcibly be printed. The terminal information control unit 154 temporarily saves the value before change in the storage unit 170.

Then, the write processing to the hold over print AP area is executed as subroutine processing (S121). After the execution is completed, the terminal information control unit 154 returns the value of print acceptability information 50 to the original value (S122).

In step S123, the terminal information control unit 154 releases the panel lock. If the panel lock is released, screen images other than the panel lock screen image 80 are displayed on the operation unit 180. Then, processing ends.

In step S124, the terminal information control unit 154 initializes the table index i stored in the storage unit 170 (S124). The terminal information control unit 154 sets "0" in the table index i.

Then, the information transfer target AP determination processing is executed as subroutine processing (S125).

Since the value of the table index i is updated to an appropriate value by the information transfer target AP determination processing, the terminal information control unit 154 executes the function indicated by the pointer corresponding to the table index i defined in the AID definition table 70 (S126).

Figure 35:
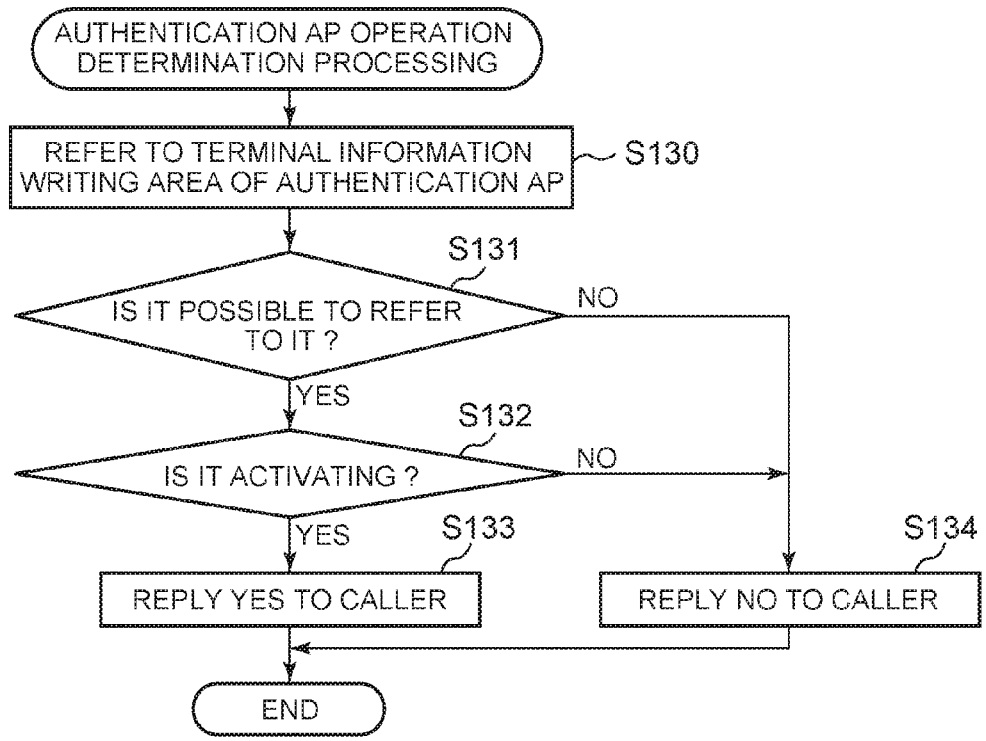
FIG. 35 is a flowchart illustrating authentication AP operation determination processing according to the first embodiment of the invention.

FIG. 35 is a flowchart illustrating authentication AP operation determination processing according to the first embodiment of the invention.

Authentication AP operation determination processing is subroutine processing for determining whether or not the authentication AP 122 is activated in the mobile terminal 110. Subroutine processing is processing performed in step S113 of FIG. 34.

The movement condition specification unit 152 of the MFP 140 accesses the terminal information writing area 11 of the authentication AP area 131 of the mobile terminal 110 by using communication means defined by the NFC communication protocol. The movement condition specification unit 152 of the MFP 140 determines whether or not this area 11 can be referred to (S 130). In the mobile terminal 110, if the authentication AP 122 is not installed, this access fails.

The movement condition specification unit 152 determines the result of access (S131), if it is referenced (Yes in S131), processing proceeds to step S132, if it is not referenced (No in S131), processing proceeds to step S134.

In step S132, the movement condition specification unit 152 refers to the value of AP status information 13 in the terminal information writing area 11 by using the communication means defined by the NFC communication protocol. Then, the movement condition specification unit 152 determines whether or not the authentication AP 122 is active (S132). If the value of AP status information 13 is "1 (active)", processing proceeds to step S133, and if the value of AP status information 13 is "0 (not activated)", processing proceeds to step S134.

In step S133, the movement condition specification unit 152 sets "YES" as the return value of this subroutine processing. Then, the movement condition specification unit 152 ends processing and returns processing to the caller.

In step S134, the movement condition specification unit 152 sets "NO" as the return value of this subroutine processing. Then, the movement condition specification unit 152 ends processing and returns processing to the caller.

Figure 36:
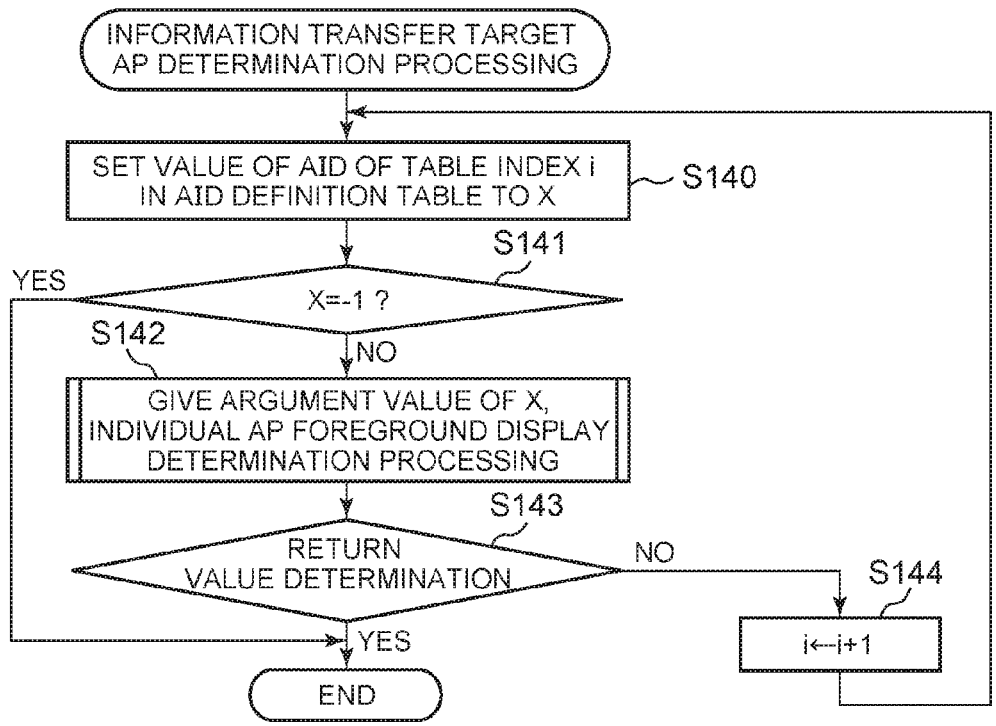
FIG. 36 is a flowchart illustrating information transfer target AP determination processing according to the first embodiment of the invention.

FIG. 36 is a flowchart illustrating information transfer target AP determination processing according to the first embodiment of the invention.

When transferring information from the MFP 140 to the mobile terminal 110, the information transfer target AP determination processing is subroutine processing for determining which AP that operates on the mobile terminal 110 is targeted. This subroutine processing is processing performed in step S125 of FIG. 34. Before this subroutine processing is executed, "0" is set in the table index i stored in the storage unit 170 by the terminal information control unit 154 (step S124 of FIG. 34).

The movement condition specification unit 152 acquires the AID of the record of the table index i in the AID definition table 70 and sets the acquired AID as the value of the variable X (S140).

Next, the movement condition specification unit 152 determines whether or not the value of the variable X is "−1" (S141).

If the value of the variable X is "−1" (Yes in S141), it means that the reference to the AID definition table 70 is ended, so the movement condition specification unit 152 ends processing without doing anything, and returns processing to the caller.

If the value of the variable X is not "−1" (No in S141), processing proceeds to step S142.

In step S142, the value of the variable X is set as an argument, and the individual AP foreground display determination processing is executed as subroutine processing.

Then, the movement condition specification unit 152 determines the return value from the individual AP foreground display determination processing (S143). If the return value is YES, the movement condition specification unit 152 returns nothing to the caller without doing anything.

If the return value is NO, the movement condition specification unit 152 adds "1" to the table index i (S144). Then, processing returns to step S140.

When subroutine processing shown in FIG. 36 is completed, the table index i stored in the storage unit 170 indicates which of the pointers of the write processing functions stored in the AID definition table 70 should be referred to.

Figure 37:
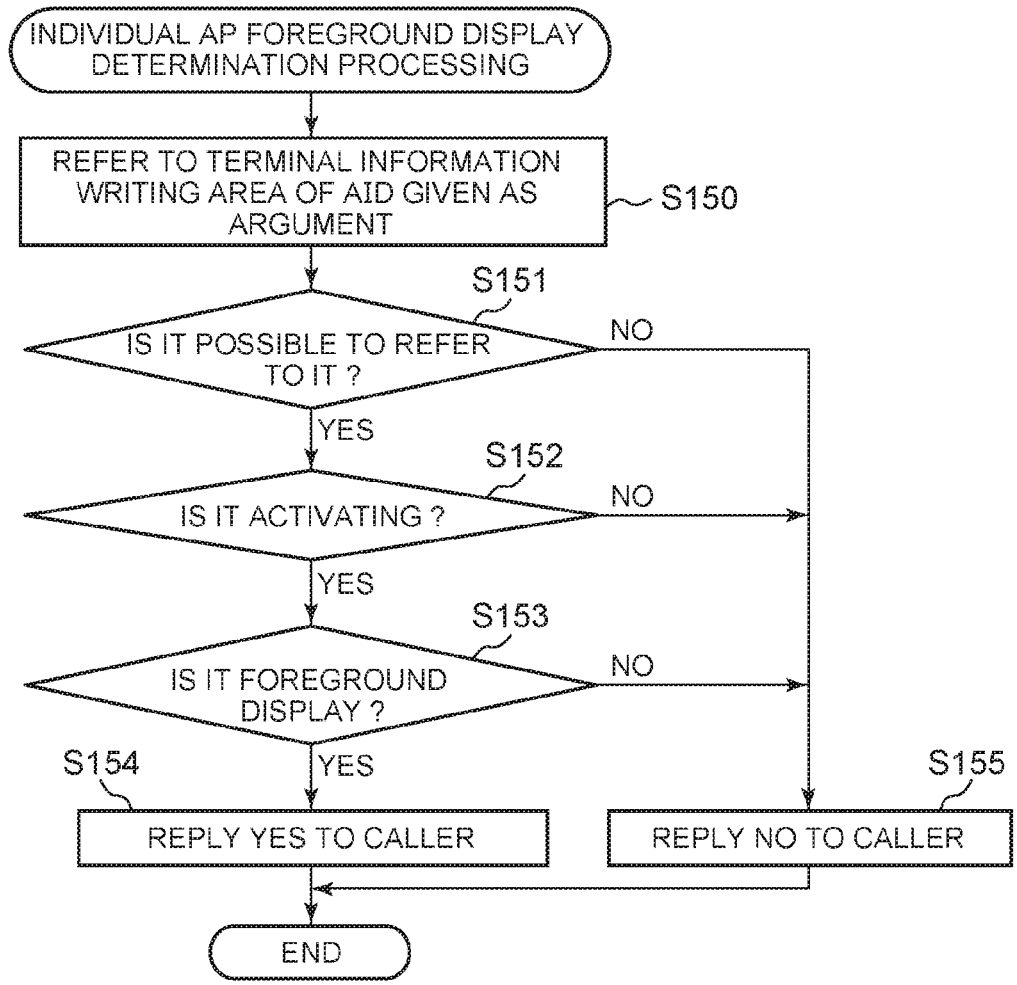
FIG. 37 is a flowchart illustrating individual AP foreground display determination processing according to the first embodiment of the invention.

FIG. 37 is a flowchart illustrating individual AP foreground display determination processing according to the first embodiment of the invention.

The individual AP foreground display determination processing is subroutine processing for determining whether each AP operating on the mobile terminal 110 is displayed on the foreground side in the mobile terminal 110 for each AP. This subroutine processing is processing performed in step S118 of FIG. 34 and step S142 of FIG. 36.

The movement condition specification unit 152 acquires information of the individual AP in the NDEF message area 130 of the mobile terminal 110 based on the argument using the communication unit defined in the NFC communication protocol (S150). The argument is a numerical value representing the AID assigned to each individual AP. If "0" is specified as the AID for the communication means defined in the NFC communication protocol, it is possible to access information of the authentication AP area 131. If "10" is specified as the AID, it is possible to access information of the operation guide AP area 132. If "20" is specified as the AID, it is possible to access information of the hold over print AP area 133.

Then, the movement condition specification unit 152 determines whether or not information can be referred to by accessing the AP area corresponding to the argument (S151). If information can be referred to (Yes in step S151), processing proceeds to step S152. If information cannot be referred to (No in step S151), processing proceeds to step S155.

In step S152, the movement condition specification unit 152 determines whether or not the AP corresponding to the argument is active by referring to AP status information 13 of the accessed area. If the AP is activated (Yes in S152), processing proceeds to step S153. If the AP is not activated (No in S152), processing proceeds to step S155.

In step S153, the movement condition specification unit 152 determines whether or not the AP corresponding to the argument is displayed in the foreground by referring to display status information 14 of the accessed area. If the AP is displayed in the foreground (Yes in S153), processing proceeds to step S154. If the AP is not displayed in the foreground (No in S153), processing proceeds to step S155 move on.

In step S154, the movement condition specification unit 152 sets "YES" as the return value of this subroutine processing. Then, the movement condition specification unit 152 ends processing and returns processing to the caller.

In step S155, the movement condition specification unit 152 sets "NO" as the return value of this subroutine processing. Then, the movement condition specification unit 152 ends processing and returns processing to the caller.

Figure 38:
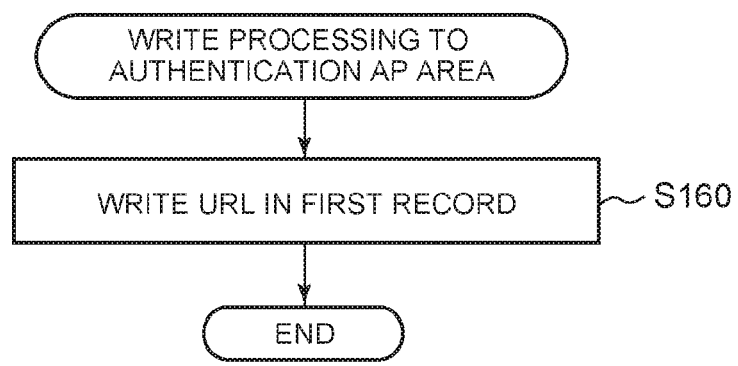
FIG. 38 is a flowchart illustrating write processing to the authentication AP area according to the first embodiment of the invention.

FIG. 38 is a flowchart illustrating write processing to the authentication AP area 131 according to the first embodiment of the invention.

Write processing to the authentication AP area 131 is subroutine processing of write processing to the authentication AP area 131 of the mobile terminal 110 by using the communication means defined by the NFC communication protocol. This subroutine process is processing performed in step S117 of FIG. 34.

The writing unit 153 specifies "0" as the AID for the communication means defined by the NFC communication protocol and accesses the authentication AP area 131 of the mobile terminal 110. Then, the writing unit 153 writes the URL corresponding to the web page that explains the registration of the IC card of the on-line manual published on the Internet in the first record 12 *a* of the apparatus information writing area 12 (S160).

Figure 39:
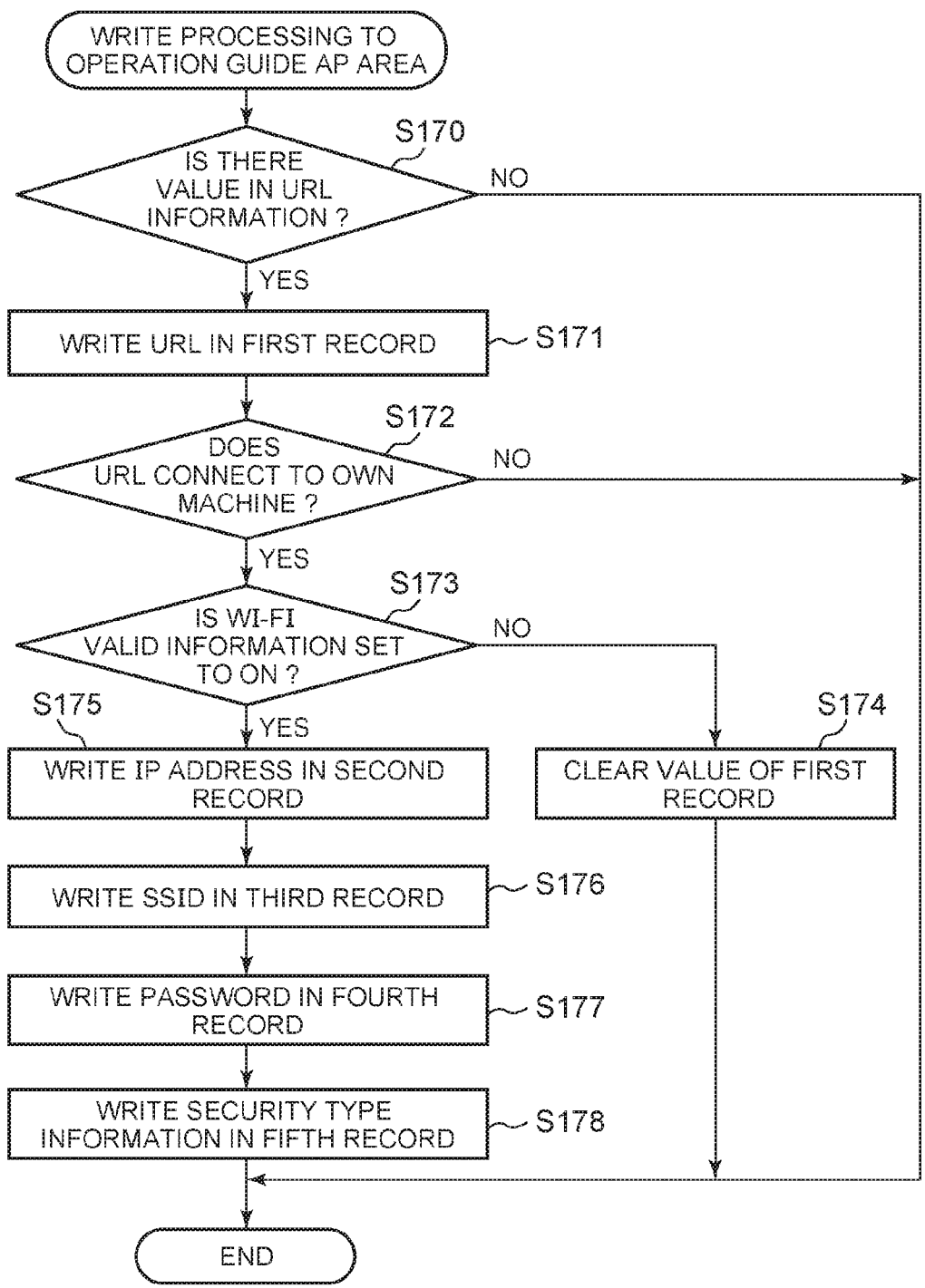
FIG. 39 is a flowchart illustrating write processing to the operation guide AP area according to the first embodiment of the invention.

FIG. 39 is a flowchart illustrating write processing to the operation guide AP area 132 according to the first embodiment of the invention.

Write processing to the operation guide AP area 132 is subroutine processing of write processing to the operation guide AP area 132 of the mobile terminal 110 by using the communication means defined by the NFC communication protocol. This subroutine process is process executed if the table index i is "1" in step S126 of FIG. 34

The writing unit 153 confirms whether or not a value is written in the URL information 40 stored in the storage unit 170 (S170). If the value is written (Yes in S170), processing proceeds to step S171. If the value is not written (No in S170), the writing unit 153 ends processing without doing anything.

The writing unit 153 specifies "10" as the AID for the communication means defined by the NFC communication protocol and accesses the operation guide AP area 132 of the mobile terminal 110. Then, the writing unit 153 writes the value of the URL 42 of URL information 40 in the first record 12 *a* of the apparatus information writing area 12.

Next, the writing unit 153 refers to own/other machine information 41 of URL information 40, and determines whether or not the URL belongs to its own machine, depending on whether or not the value is "1" (S172). If the URL belongs to the own machine (Yes in S172), processing proceeds to step S173. If the URL is not the own machine (No in S172), the writing unit 153 ends processing without doing anything and returns processing to the caller.

In step S173, the writing unit 153 refers to Wi-Fi valid/invalid information 31 and determines whether the Wi-Fi connection is valid. If the Wi-Fi connection is invalid (No in S173), processing proceeds to step S174. If the Wi-Fi connection is valid (Yes in S173), processing proceeds to step S175.

In step S174, it is not possible to access the web server unit 158 of the MFP 140 from the mobile terminal 110. Therefore, the writing unit 153 clears the value of the first record 12 *a* of the apparatus information writing area 12 in the operation guide AP area 132 of the mobile terminal 110. Then, the writing unit 153 ends processing.

In steps S175 to S178, in the operation guide AP area 132, the writing unit 153 sequentially writes the IP address 32, the SSID 33, the password 34 and the security type information 35 of Wi-Fi connection information 30 from the second record 12 *b* to the fifth record in the apparatus information writing area 12. Then, the writing unit 153 ends processing.

Figure 40:
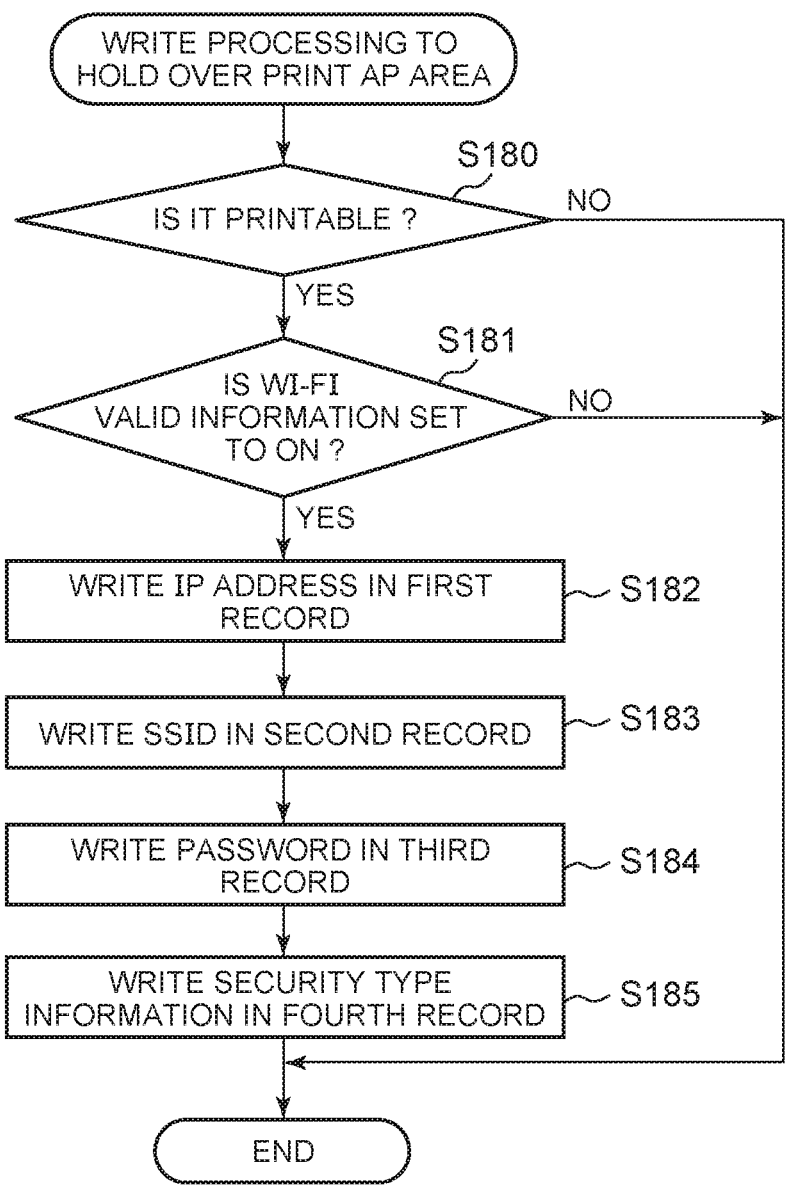
FIG. 40 is a flowchart illustrating write processing to the hold over print AP area to the first embodiment of the invention.

FIG. 40 is a flowchart illustrating write processing to the hold over print AP area 133 to the first embodiment of the invention.

Write processing to the hold over print AP area 133 is subroutine processing of write processing to the hold over print AP area 133 of the mobile terminal 110 by using the communication means defined by the NFC communication protocol. This subroutine process is process executed if the table index i is "2" in step S126 of FIG. 34

The writing unit 153 determines whether or not printing can be accepted by referring to print acceptability information 50 stored in the storage unit 170 (S180). If acceptance of printing is impossible (No in S180), the writing unit 153 ends processing without doing anything. If acceptance of printing is possible (Yes in S180), processing proceeds to step S181.

In step S181, the writing unit 153 refers to Wi-Fi valid/invalid information 31 and determines whether the Wi-Fi connection is valid. If the Wi-Fi connection is invalid (No in S181), the writing unit 153 ends processing without doing anything. If the Wi-Fi connection is valid (Yes in S181), processing proceeds to step S182.

In steps S182 to S185, in the hold over print AP area 133, the writing unit 153 sequentially writes the IP address 32, the SSID 33, the password 34 and the security type information 35 of Wi-Fi connection information 30 from the first record 12 *a* to the fourth record in the apparatus information writing area 12. Then, the writing unit 153 ends processing.

The above is the processing in the MFP 140 according to the first embodiment.

Processing after holding the mobile terminal 110 over the MFP 140 will be described.

Figure 41:
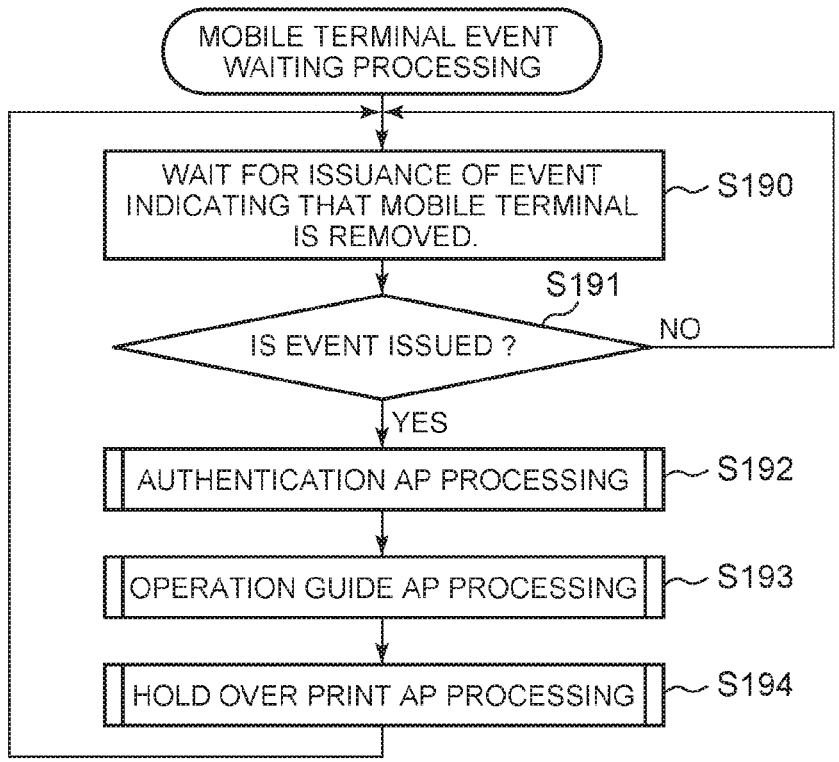
FIG. 41 is a flowchart illustrating event waiting processing performed by the AP control unit according to the first embodiment of the invention.

FIG. 41 is a flowchart illustrating event waiting processing performed by the AP control unit 121 according to the first embodiment of the invention.

The AP control unit 121 waits until an event in which the mobile terminal 110 is removed from the MFP 140 is issued via the NFC I/F unit 111 (S190). For example, the AP control unit 121 can acquire such an event from the OS by using the OS function of the mobile terminal 110. Then, if such an event is issued (Yes in S191), processing proceeds to step S192.

In step S192, authentication AP processing is executed.

Next, the operation guide AP processing is executed (S193), and the hold over print AP processing is executed (S194).

Figure 42:
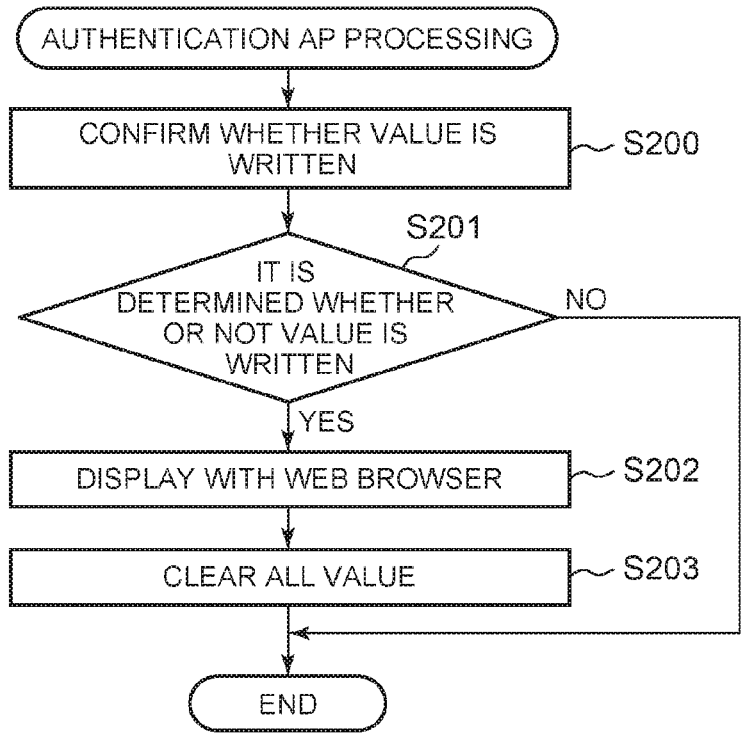
FIG. 42 is a flowchart illustrating authentication AP processing according to the first embodiment of the invention.

FIG. 42 is a flowchart illustrating authentication AP processing according to the first embodiment of the invention.

The authentication AP processing is processing executed in step S192 of FIG. 41.

In the authentication AP area 131, the authentication AP 122 confirms whether or not any value is written in the apparatus information writing area 12 (S200), and determines the result (S201). As a result, if the value is written, processing proceeds to step S202. If the value is not written, the authentication AP 122 ends processing without doing anything.

In step S202, in the authentication AP area 131, the authentication AP 122 accesses the URL stored in the first record 12*a* of the apparatus information writing area 12 and displays the image of the Web page (image of an explanation screen for registering IC card information IM2) on the display unit 113 by using the web browser (S202).

Thereafter, the authentication AP 122 clears all information of the apparatus information writing area 12 in the authentication AP area 131 (S203).

Figure 43:
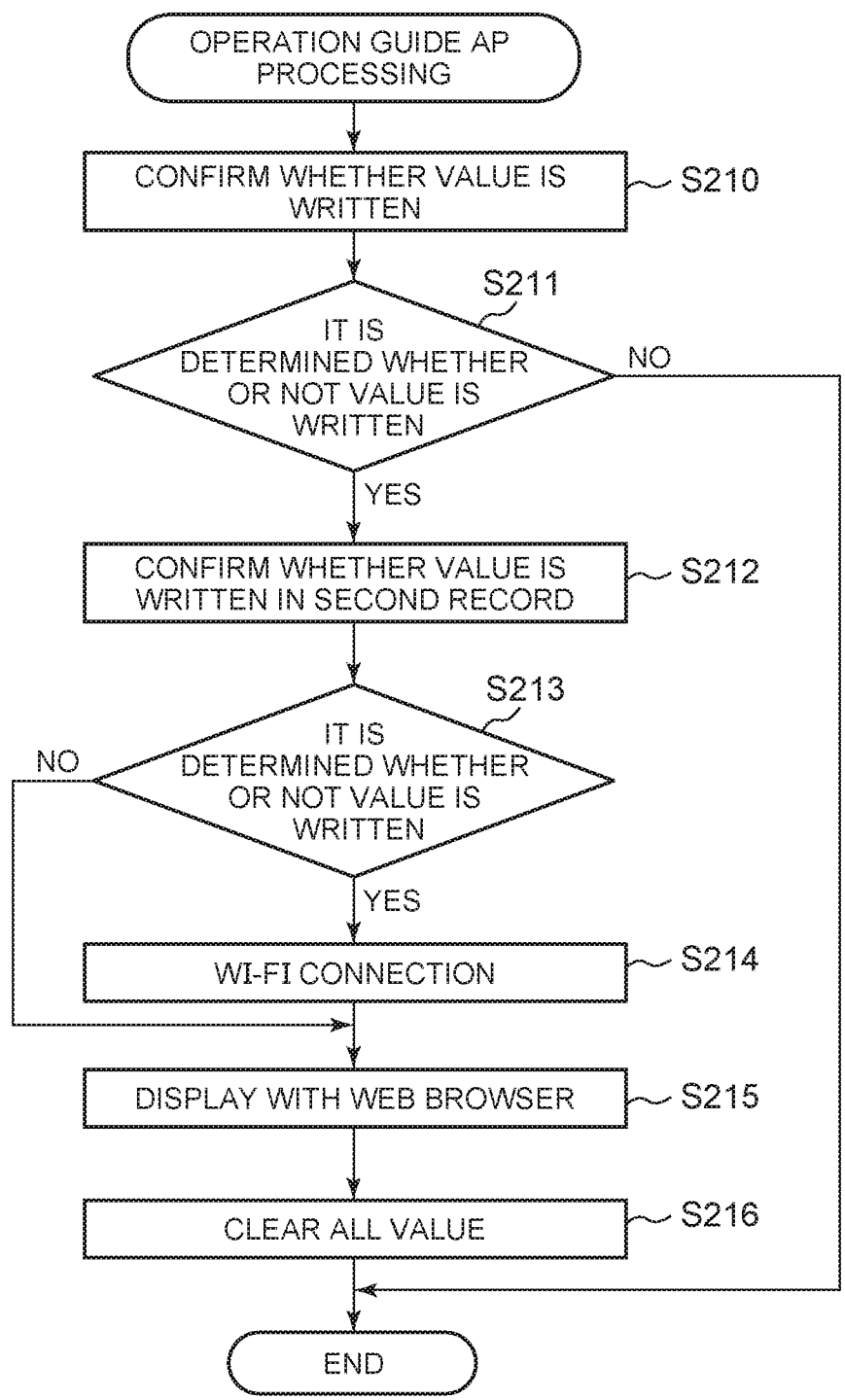
FIG. 43 is a flowchart illustrating operation guide AP processing according to the first embodiment of the invention.

FIG. 43 is a flowchart illustrating operation guide AP processing according to the first embodiment of the invention.

The operation guide AP processing is processing executed in step S193 of FIG. 41.

In the operation guide AP area 132, the operation guide AP 123 confirms whether or not any value is written in the apparatus information writing area 12 (S210), and determines the result (S211). As a result, if the value is written, processing proceeds to step S212. If the value is not written, the operation guide AP 123 ends processing without doing anything.

In step S212, in the operation guide AP area 132, the operation guide AP 123 confirms whether or not a value is written in the second record 12b of the apparatus information writing area 12 (S212), and determines the result (S213). As a result, if the value is written, processing proceeds to step S214, and if the value is not written, processing proceeds to step S215.

In step S214, since the URL notified from the MFP 140 is the URL provided by the Web server unit 158 in the MFP 140, in the operation guide AP area 132, the operation guide AP 123 retrieves from the second record 12 b to the fifth record of the apparatus information writing area 12. The operation guide AP 123 performs Wi-Fi direct connection with the MFP 140 based on the retrieve information. Then, processing proceeds to step S215.

In step S215, in the operation guide AP area 132, the operation guide AP 123 accesses the URL stored in the first record 12a of the apparatus information writing area 12, and displays the image of web page on the display unit 113 by using the web browser. In the operation guide AP area 132, if the value is not written in the second record 12 b of the apparatus information writing area 12, the operation guide AP 123 does not need to establish a new Wi-Fi connection. The operation guide AP 123 may communicate via an already connected access point.

For example, the image displayed in the case of going through step S214 is the image of a screen for changing a menu IM4 shown in FIG. 12. On the other hand, the image displayed in the case of not going through step S214 is the screen image for explaining the copy operation IM3 shown in FIG. 11.

After that, the operation guide AP 123 clears all information in the apparatus information writing area 12 in the operation guide AP area 132 (S216).

Figure 44:
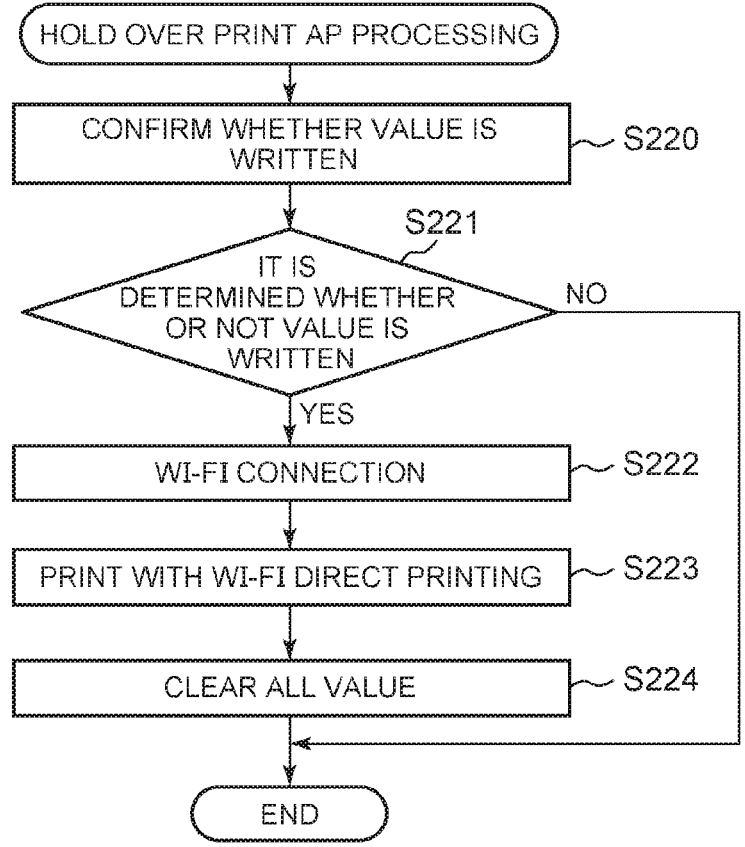
FIG. 44 is a flowchart illustrating hold over print AP processing according to the first embodiment of the invention.

FIG. 44 is a flowchart illustrating hold over print AP processing according to the first embodiment of the invention.

The hold over print AP processing is processing executed in step S194 of FIG. 41.

In the hold over print AP area 133, the hold over print AP 124 confirms whether or not any value is written in the apparatus information writing area 12 (S220), and determines the result (S221). As a result, if the value is written, processing proceeds to step S222. If the value is not written, the hold over print AP 124 ends processing without doing anything.

In step S222, in the hold over print AP 133, the hold over print AP 124 retrieves from the first record 12 a to the fourth record of the apparatus information writing area 12. The hold over print AP 124 performs Wi-Fi direct connection with the MFP 140 based on the retrieve information.

Then, the hold over print AP 124 issues a print request to the MFP 140 for the print image IM 1 displayed on the display unit 113 by using the Wi-Fi direct printing mechanism (S 223).

Thereafter, the hold over print AP 124 clears all information in the apparatus information writing area 12 in the hold over print AP area 133 (S224).

As described above, according to the first embodiment, from the result of comparing the apparatus status of the mobile terminal 110 and the apparatus status of the MFP 140, the MPF 140 provides the information that the user would like from the MFP 140 to the mobile terminal 110. By simply holding the mobile terminal 110 over the MFP 140, the user can acquire not only error information but also optimum information desired by the user at that point in time, and can execute the function.

In the first embodiment described above, it is described that the operation guide AP 123 and the hold over print AP 124 perform Wi-Fi direct connection between the mobile terminal 110 and the MFP 140. However, if a wireless access point is already set in the mobile terminal 110 and the MFP 140 has the function of a wireless access point, the mobile terminal 110 temporarily stores the setting of the current wireless access point. Then, after switching to the wireless access point of the MFP 140 and performing necessary processing, returning to the stored setting of the previous wireless access point is general processing.

(2) Second Embodiment

Figure 45:
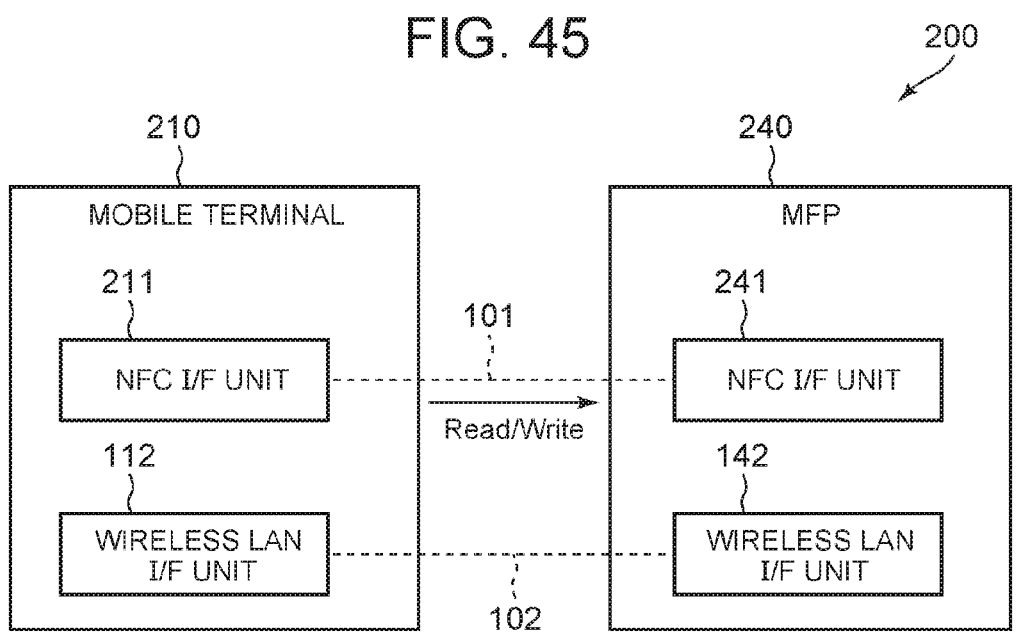
FIG. 45 is a diagram of the communication system according to a second embodiment of the invention.

FIG. 45 is a diagram of the communication system 200 according to a second embodiment of the invention.

The communication system 200 includes a mobile terminal 210 and an MFP 240.

The mobile terminal 210 includes an NFC I/F unit 211 and a wireless LAN I/F unit 112.

The MFP 240 includes an NFC I/F unit 241 and a wireless LAN I/F unit 142.

The NFC I/F unit 211 and the NFC I/F unit 241 are interface for executing the NFC wireless communication 101 according to the NFC standard. In the second embodiment, in terms of NFC communication, the mobile terminal 210 functions as a Reader/Writer that performs reading and writing of information. By accessing the MPF 240, the NFC I/F unit 211 acquires apparatus status information of the MPF 240. The NFC I/F unit 211 is also referred to as a first acquiring unit.

The wireless LAN I/F unit 112 and the wireless LAN I/F unit 142 are interface for connecting to the Internet via the wireless LAN according to the Wi-Fi standard.

Since the wireless LAN I/F unit 142 of the MFP 240 supports the Wi-Fi direct type, it is possible to realize the wireless LAN communication 102 by P2P with the target device without going through the access point.

Figure 46:
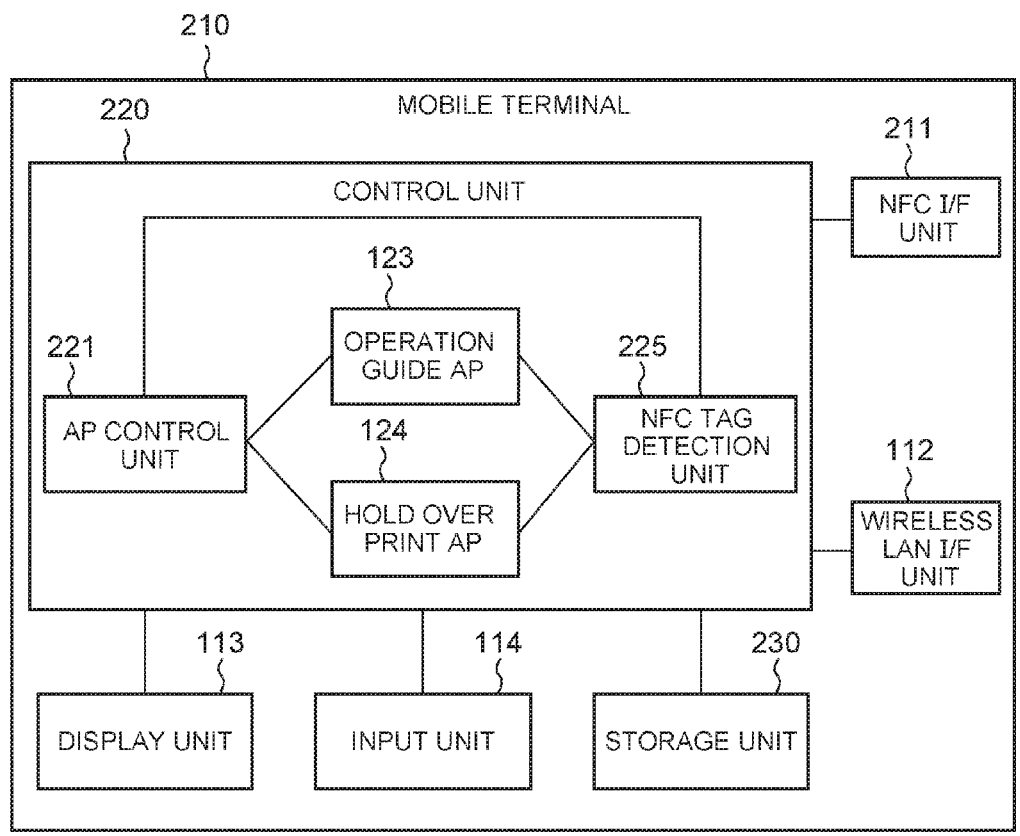
FIG. 46 is a block diagram illustrating the configuration of the mobile terminal according to the second embodiment of the invention.

FIG. 46 is a block diagram illustrating the configuration of the mobile terminal 210 according to the second embodiment of the invention.

The mobile terminal 210 includes an NFC I/F unit 211, a wireless LAN I/F unit 112, a display unit 113, an input unit 114, a control unit 220, and a storage unit 230.

The display unit 113 and the input unit 114 have the same configuration as the display unit 113 and the input unit 114 of the first embodiment.

The control unit 220 includes an AP control unit 221, an operation guide AP 123, a print AP 124, and an NFC tag detection unit 225.

In the second embodiment, two kinds of applications can operate on the mobile terminal 210. Two kinds of APs are the operation guide AP 123, and the hold over print AP 124. The operation guide AP 123 and the hold over print AP 124 are functioned similarly to the first embodiment. The control unit 220 has an AP control unit 221 that comprehensively manages these two kinds of APs.

If the mobile terminal 210 is held over the MFP 240 so that the MFP 240 enters a card and terminal detection area (not shown) of the mobile terminal 210, the NFC tag detection unit 225 detects the NFC tag 243 in the MFP 240 described later via the NFC I/F unit 211 and the NFC I/F unit 241.

The storage unit 230 stores necessary information for processing in the mobile terminal 210.

For example, the storage unit 230 stores control information 234 managed by the NFC tag detection unit 225 in the mobile terminal 210.

Figure 47:
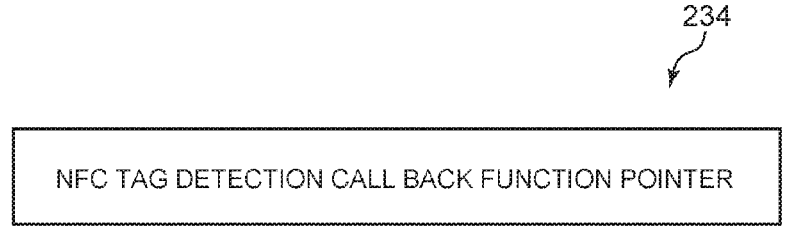
FIG. 47 is a diagram illustrating an internal structure of control information according to the second embodiment of the invention.

FIG. 47 is a diagram illustrating an internal structure of control information 234 according to the second embodiment of the invention.

If any one of the screen image of the operation guide AP 123 or the screen image of the print AP 124 is displayed on the display unit 113 of the mobile terminal 210, control information 234 stores an NFC tag detection callback function pointer. The NFC tag detection callback function pointer is a pointer to a callback function for notifying the operation guide AP 123 or the printing AP 124 that the NFC tag 243 has been detected. The control unit 220 acquires the apparatus status of the mobile terminal 210 from the control information 234. The control unit 220 is also referred to as a second acquiring unit.

Figure 48:
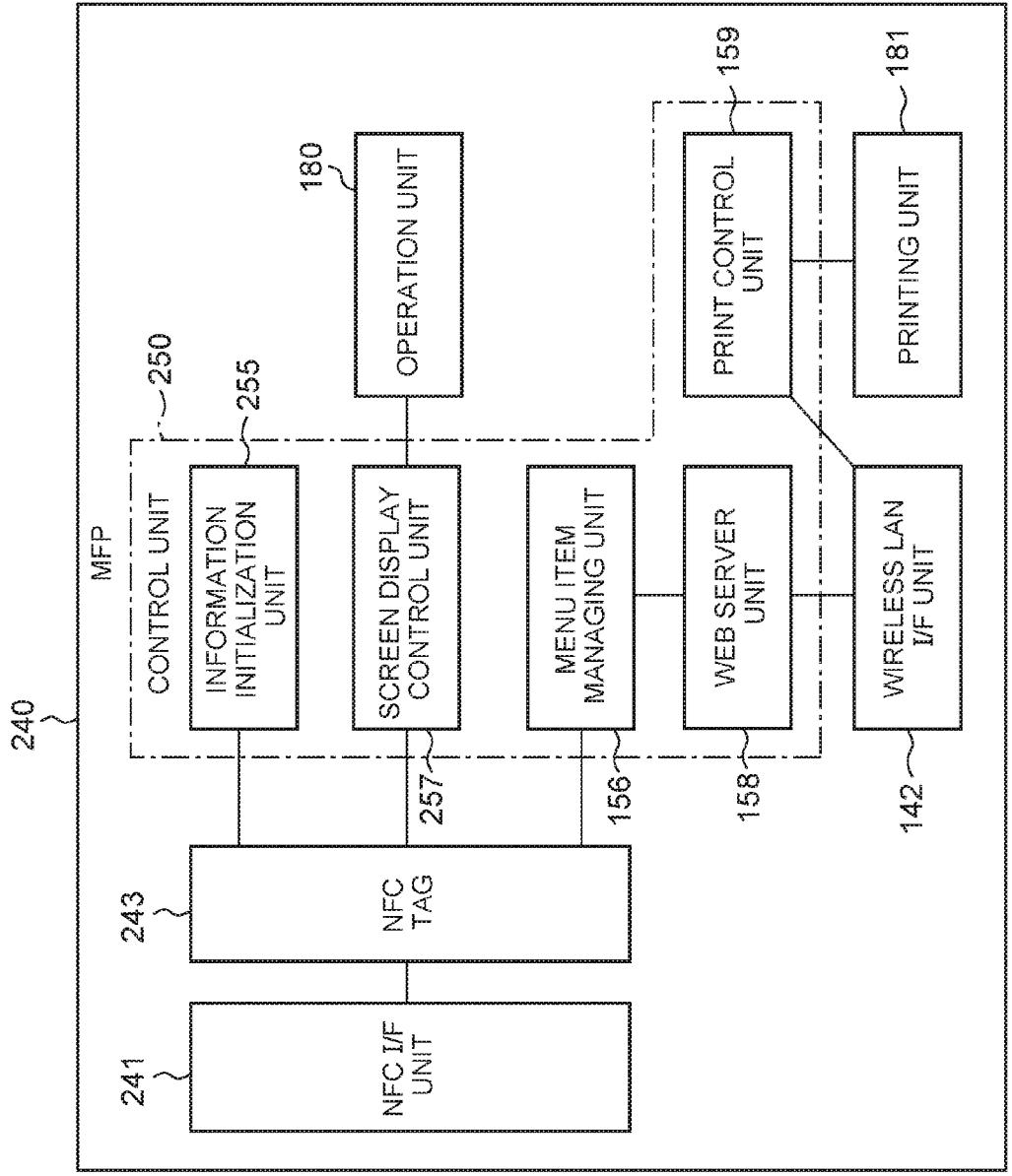
FIG. 48 is a block diagram illustrating the configuration of the MFP according to the second embodiment of the invention.

FIG. 48 is a block diagram illustrating the configuration of the MFP 240 according to the second embodiment of the invention.

The MFP 240 includes an NFC I/F unit 241, a wireless LAN I/F unit 142, an NFC tag 243, a control unit 250, an operation unit 180, and a printing unit 181. The operation unit 180 and the printing unit 181 in the second embodiment are configured in the same manner as in the first embodiment.

The NFC tag 243 functions as a storage unit that stores necessary information for processing in the MFP 240. The mobile terminal 210 can access the NFC tag 243 via the NFC I/F unit 211 and the NFC I/F unit 241. The NFC tag 243 functions as an NDEF message area which is a data area to be read and written from the mobile terminal 210 via the NFC I/F unit 211 and the NFC I/F unit 241.

Figure 49:
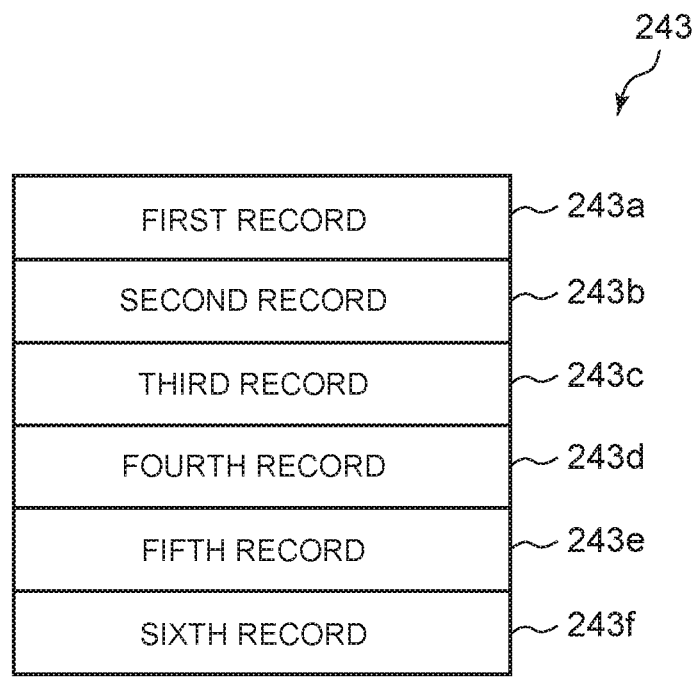
FIG. 49 is a diagram illustrating an internal structure of the Near Field Communication (NFC) tag according to the second embodiment of the invention.

FIG. 49 is a diagram illustrating an internal structure of the NFC 243 tag according to the second embodiment of the invention.

The NFC tag 243 is composed of L variable length records (L is an integer of 1 or more). In the second embodiment, the NFC tag 243 has six records 243 *a* to 243 *f* in total. Information for Wi-Fi connection is stored from the first record 243 *a* to the fourth record 243 *d*. For example, the first record 243 *a* stores the IP address, the second record 243 *b* stores the SSID, the third record 243 *c* stores the password, and the fourth record 243 *d* stores security type information (WEP, WPA, etc.).

The fifth record 243 *e* stores the URL of the image to be displayed on the display unit 113 of the mobile terminal 210.

The sixth record 243 *f* stores own/other machine information. The own/other machine information is information whether the URL stored in the fifth record 243 *e* is the address of the web page provided by the web server unit 158 in the MFP 240 or the address of the web page published on the Internet.

Figure 50:
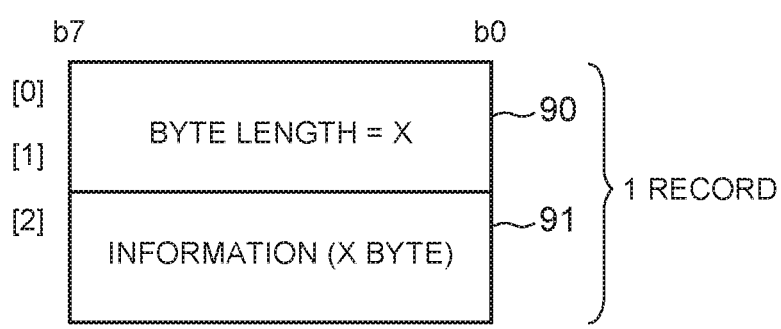
FIG. 50 is a diagram illustrating a structure of one record including the NFC tag according to the second embodiment of the invention.

As shown in FIG. 50, the structure of one record 243 *a* to 243 *f* included in the NFC tag 243 is the byte length 90 of the information 91 whose leading 2 bytes are consecutive thereafter.

Returning to FIG. 48, the control unit 250 controls processing in the MFP 240. For example, the control unit 250 changes information stored in the NFC tag 243 according to the status of the MFP 240. Specifically, the control unit 250 identifies the screen image displayed on the operation unit 180, and changes the information stored in the NFC tag 243 according to the specified screen image.

The control unit 250 includes an information initialization unit 255, a menu item managing unit 256, a screen display control unit 257, a web server unit 158, and a print control unit 159. The Web server unit 158 and the print control unit 159 according to the second embodiment are configured in the same manner as in the first embodiment.

The information initialization unit 255 initializes information in the NFC tag 243.

The menu item managing unit 256 refers to information in the NFC tag 243 and changes various parameter (menu) items in the MFP 240.

The screen display control unit 257 controls the operation unit 180 that realizes the UI with the user. The screen display control unit 257 refers to the information in the NFC tag 243 or writes the information in the NFC tag 243 according to an instruction or the like from the user input to the operation unit 180.

FIGS. 51 to 52 are operation matrices according to respective status between the mobile terminal 210 and the MFP 240 in order to make it easy to understand the behavior in the second embodiment. That is, the mobile terminal 210 changes the predetermined behavior based on apparatus status information acquired by the first acquiring unit and the second acquiring unit. The operation flow for realizing behavior described in this operation matrix will be described below.

The operation in the second embodiment will be described with reference to the drawings.

Figure 53:
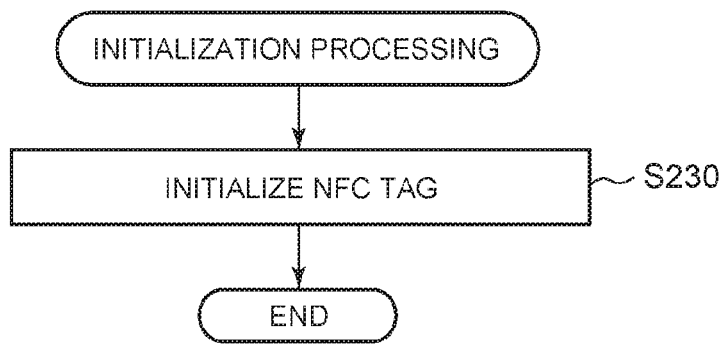
FIG. 53 is a flowchart illustrating initialization processing performed by the information initialization unit of the MFP at power-on or the like according to the second embodiment of the invention.

FIG. 53 is a flowchart illustrating initialization processing performed by the information initialization unit 255 of the MFP 240 at power-on or the like according to the second embodiment of the invention.

The information initialization unit 255 initializes the contents of the NFC tag 243 (S230). Specifically, the information initialization unit 255 sets "0" or a blank character column indicating that all are not set as the IP address, SSID, password and security type information stored in the first record 243 *a* to the fourth record 243 *d* of the NFC tag 243. Further, the information initialization unit 255 sets "0" indicating own machine information as own/other machine information to be stored in the sixth record 243 *f* of the NFC tag 243, and sets the empty character column as the URL to be stored in the fifth record 243 *e*.

Figure 54:
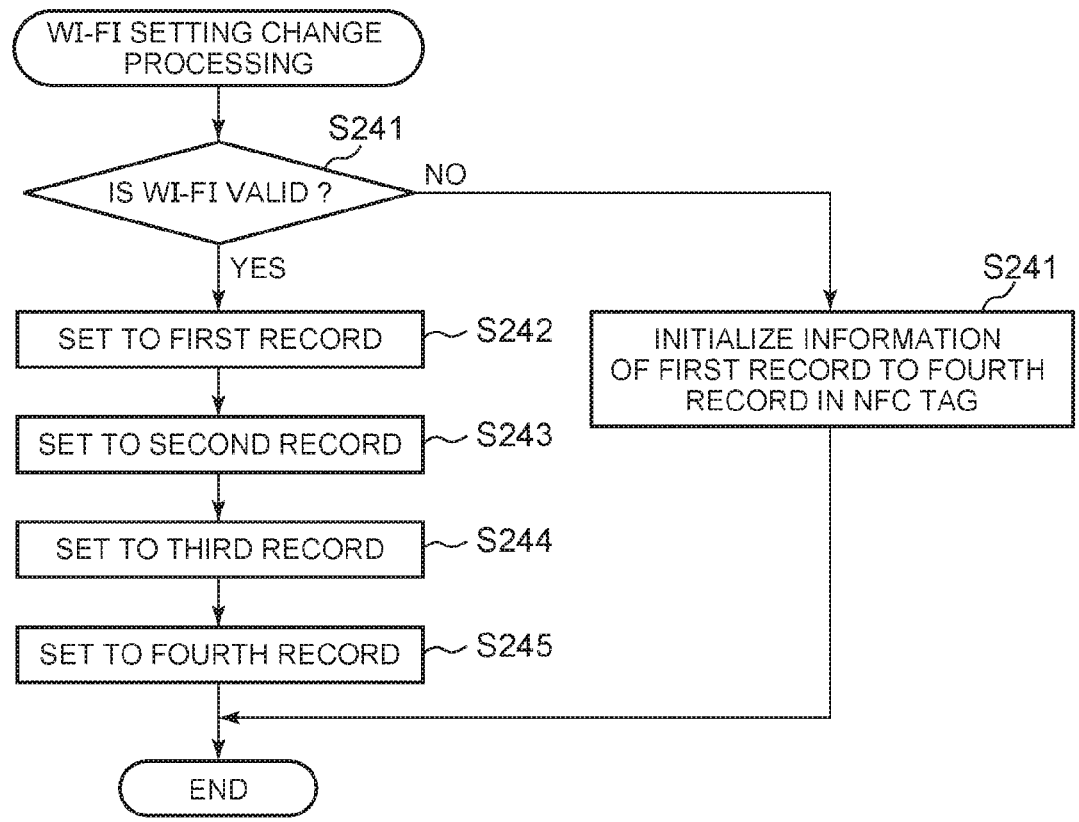
FIG. 54 is a flowchart illustrating Wi-Fi setting change processing performed by the menu item managing unit of the MFP according to the second embodiment of the invention.

FIG. 54 is a flowchart illustrating Wi-Fi setting change processing performed by the menu item managing unit 256 of the MFP 240 according to the second embodiment of the invention.

If the user changes the menu related to the Wi-Fi setting by means not shown, this flow is executed.

The menu item managing unit 256 confirms whether Wi-Fi connection is set to be valid (S240). If the Wi-Fi connection is set to be invalid (No in S240), processing proceeds to step S241. If the Wi-Fi connection is set to be valid (Yes in S240), processing proceeds to step S242.

In step S241, the menu item managing unit 256 initializes the values from the first record 243 *a* to the fourth record 243 *d* of the NFC tag 243. Specifically, the information initialization unit 255 sets "0" or a blank character column indicating that all are not set as the IP address, SSID, password and security type information stored in the first record 243 *a* to the fourth record 243 *d* of the NFC tag 243.

In step S242, the menu item managing unit 256 sets the changed IP address in the first record 243 *a* of the NFC tag 243. Thereafter, the menu item managing unit 256 sequentially stores the changed SSID, the changed password, and the changed security type information in the second record 243 *b* to the fourth record 243 *d* (S243 to S 245).

Figure 55:
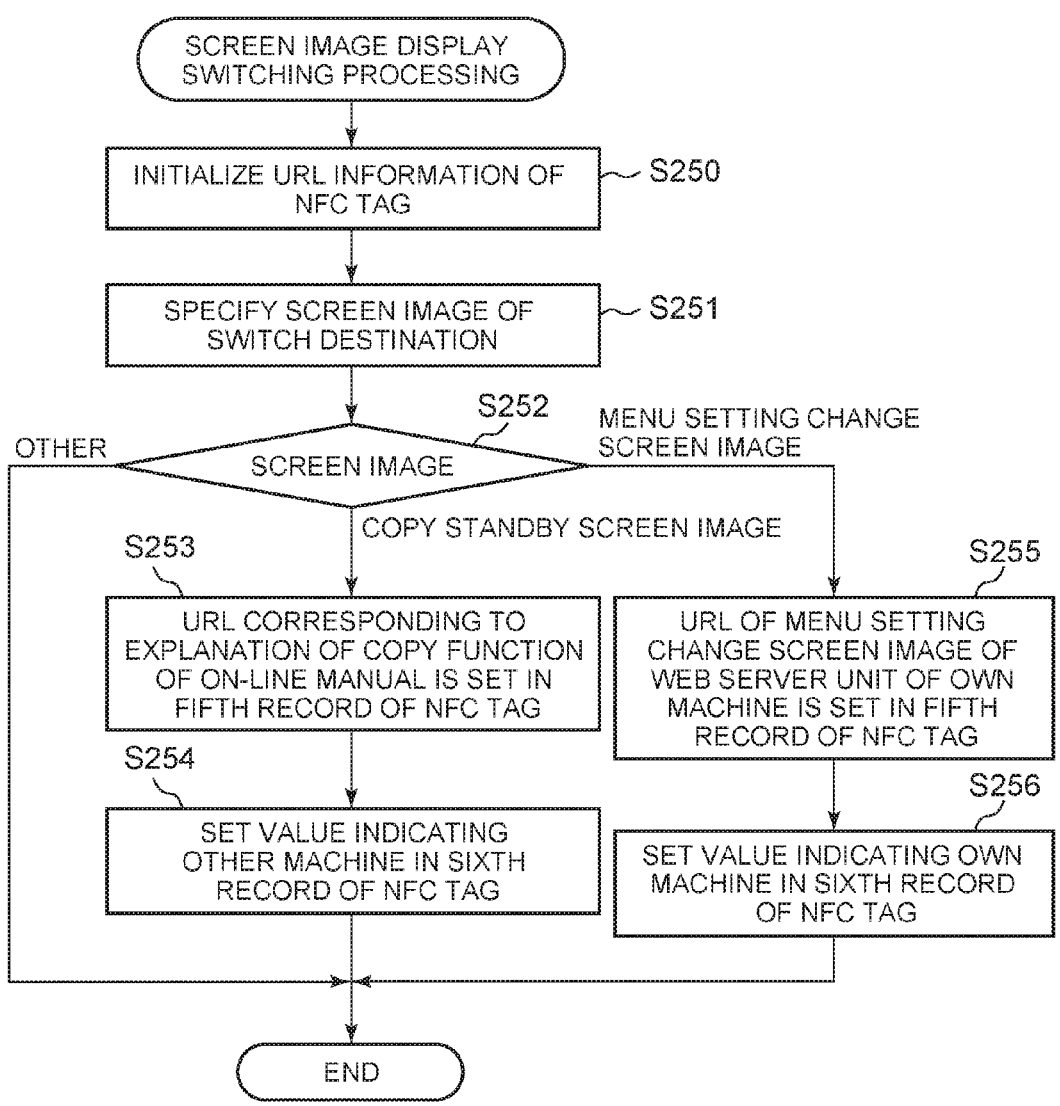
FIG. 55 is a flowchart illustrating screen image display switching processing performed by the screen display control unit of the MFP according to the second embodiment of the invention.

FIG. 55 is a flowchart illustrating screen image display switching processing performed by the screen display control unit 257 of the MFP 240 according to the second embodiment of the invention.

This flow is executed each time the screen image displayed on the operation unit 180 is switched.

The screen display control unit 257 initializes the values of the fifth record 243 *e* and the sixth record 243 *f* in the NFC tag 243 (S250). Specifically, the screen display control unit 257 sets an empty character column in the fifth record 243 *e* of the NFC tag 243 and "0" indicating own machine in the sixth record 243 *f*.

Next, the screen display control unit 257 specifies a specific screen image to be displayed on the operation unit 180 (S251). If the screen image to be displayed is the copy standby screen image 81 (S252), processing proceeds to step S253. If the screen image to be displayed is the menu setting change screen image 82 (S252), processing proceeds to step S255. If the screen image to be displayed is not the copy standby screen image 81 and the menu setting change screen image 82 (S252), the screen display control unit 257 ends the process without doing anything.

In step S253, the screen display control unit 257 sets the URL corresponding to the Web page that explains the copy function of the on-line manual published on the Internet in the fifth record 243 *e* of the NFC tag 243. In other words, the screen display control unit 257 sets the URL for displaying the screen image for explaining the copy operation IM3 in the fifth record 243 *e* of the NFC tag 243.

Then, the screen display control unit 257 sets "1" indicating other machine as own/other machine information in the sixth record 243 *f* of the NFC tag 243 (S254).

In step S255, the screen display control unit 257 sets the URL corresponding to the web page provided by the web server unit 158 of the own apparatus. In other words, the screen display control unit 257 sets the URL for displaying the image of a screen for changing a menu IM 4 in the fifth record 243 *e* of the NFC tag 243.

In addition, the screen display control unit 257 sets "0" indicating own machine as own/other machine information in the sixth record 243 *f* of the NFC tag 243 (S256).

Figure 56:
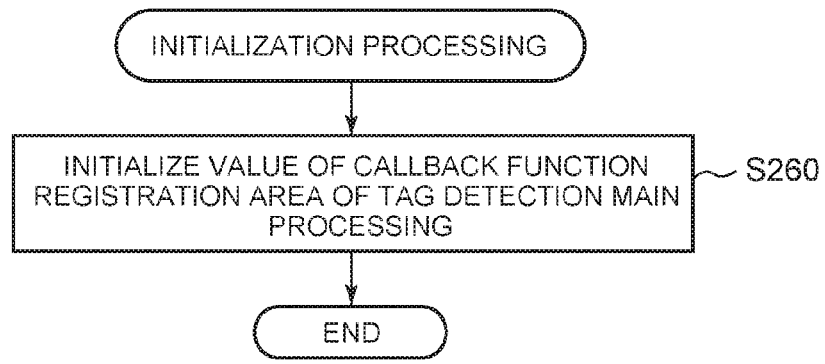
FIG. 56 is a flowchart illustrating initialization processing performed by a NFC tag detection unit of the mobile terminal at power-on according to the second embodiment of the invention.

FIG. 56 is a flowchart illustrating initialization processing performed by a NFC tag detection unit 225 of the mobile terminal 210 at power-on according to the second embodiment of the invention.

The NFC tag detection unit 225 initializes the value of the NFC tag detection callback function pointer stored in the storage unit 230 (S260). Specifically, the NFC tag detection unit 225 sets "0 (NULL)" as its value.

In the second embodiment, no special processing exists when the operation guide AP 123 and the hold over print AP 124 are installed and when these are activated, so that the description will be omitted.

Figure 57:
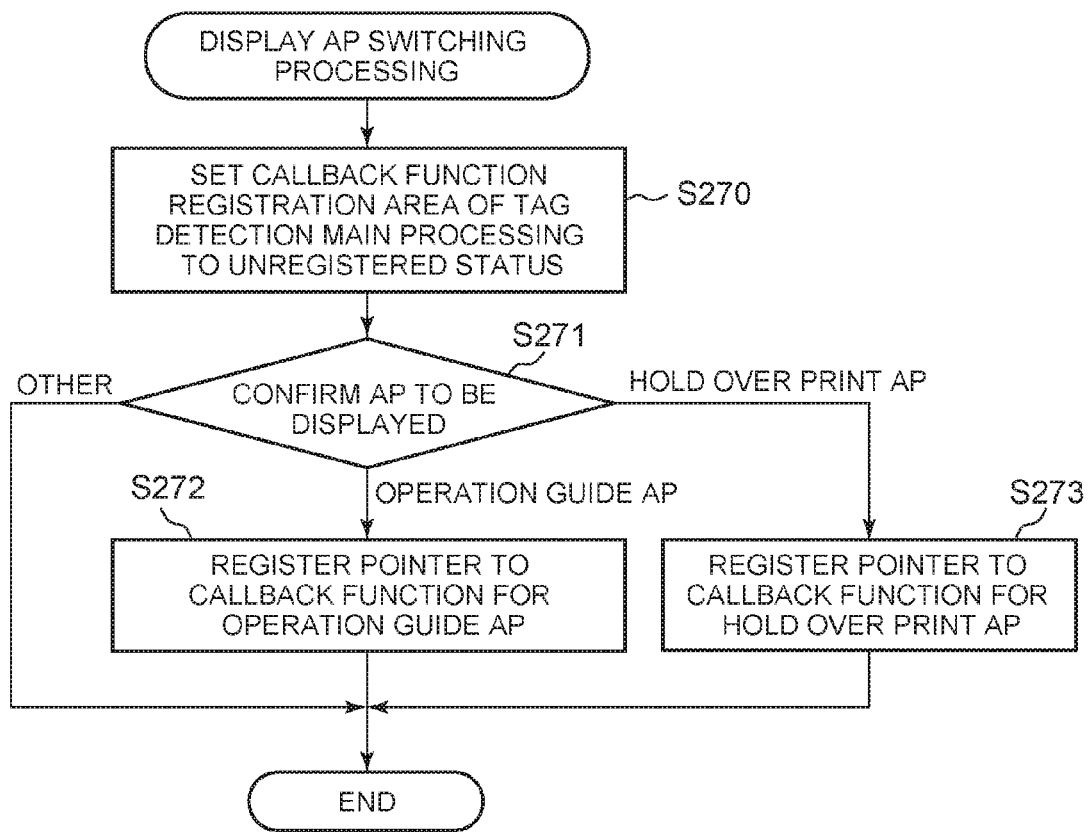
FIG. 57 is a flowchart illustrating display AP switching processing performed by the AP control unit of the mobile terminal according to the second embodiment of the invention.

FIG. 57 is a flowchart illustrating display AP switching processing performed by the AP control unit 221 of the mobile terminal 210 according to the second embodiment of the invention.

This process is executed every time the AP displayed on the display unit 113 of the mobile terminal 210 is switched.

The NFC tag detection unit 225 sets the area for registering the NFC tag detection callback function pointer in the storage unit 230 to an unregistered status (S270). Specifically, the NFC tag detection unit 225 sets "0 (NULL)" as the value of the NFC tag detection callback function pointer.

Next, the AP control unit 221 confirms the AP to be displayed on the foreground of the display unit 113 (S271). If the AP displayed on the foreground is the operation guide AP 123, processing proceeds to step S272, and if the AP displayed on the foreground is hold over print AP 124, processing proceeds to step S273.

In step S272, the NFC tag detection unit 225 registers a pointer to a callback function for the operation guide AP in the area for registering the NFC tag detection callback function pointer in the storage unit 230.

On the other hand, in step S273, the NFC tag detection unit 225 registers a pointer to the callback function for the hold over print AP in the area for registering the NFC tag detection callback function pointer in the storage unit 230.

Figure 58:
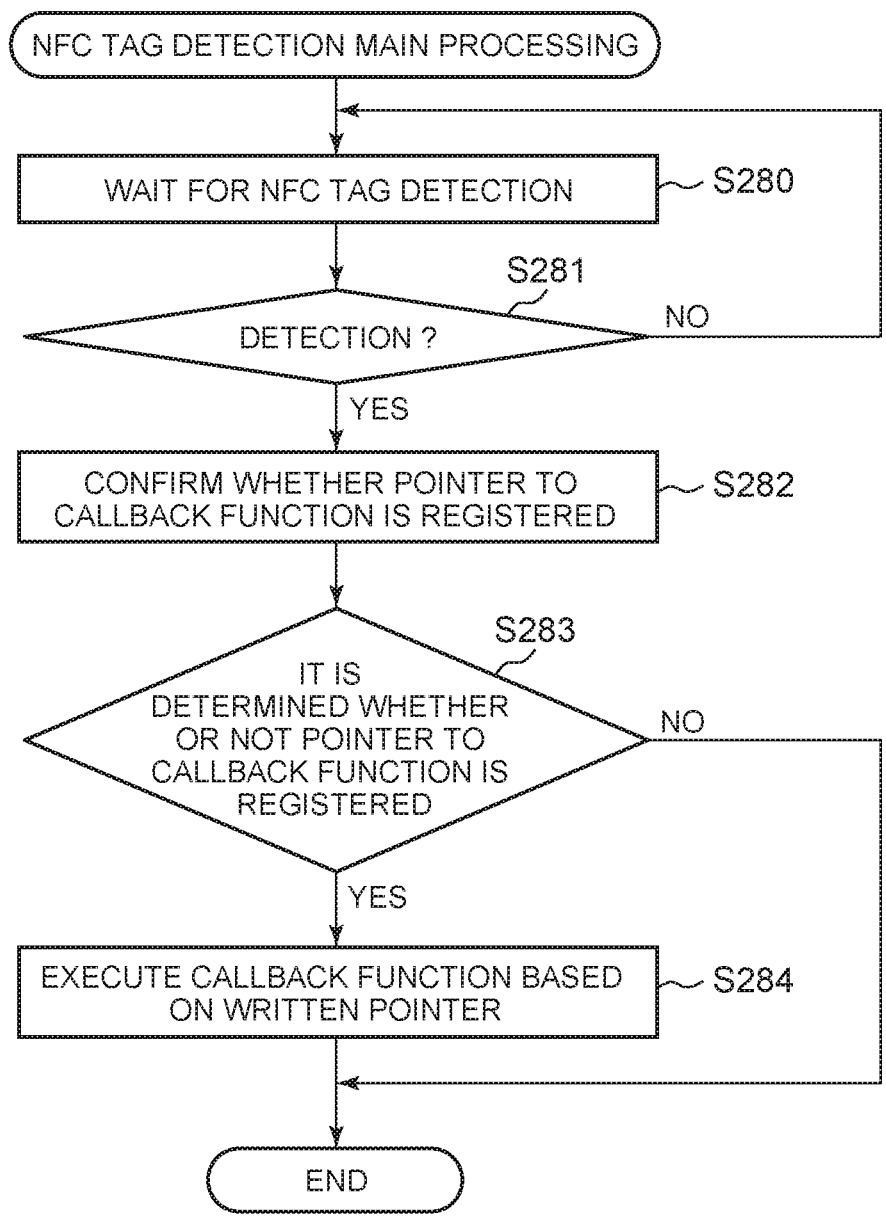
FIG. 58 is a flowchart illustrating main processing performed by the NFC tag detection unit according to the second embodiment of the invention.

FIG. 58 is a flowchart illustrating main processing performed by the NFC tag detection unit 225 according to the second embodiment of the invention.

The NFC tag detection unit 225 waits for the detection of the NFC tag 243 via the NFC I/F unit 211 (S280). Then, if the NFC tag 243 is detected (Yes in S281), processing proceeds to step S282.

In step S282, the NFC tag detection unit 225 confirms whether or not the NFC tag detection callback function pointer is registered in the storage unit 230 (S282). If the NFC tag detection callback function pointer is not registered (in the case of 0) (S283), the NFC tag detection unit 225 ends processing without doing anything. If the NFC tag detection callback function pointer is registered (S283), processing proceeds to step S284.

In step S284, the NFC tag detection unit 225 causes the operation guide AP 123 or the hold over print AP 124 to perform callback processing based on the value of the NFC tag detection callback function pointer.

Figure 59:
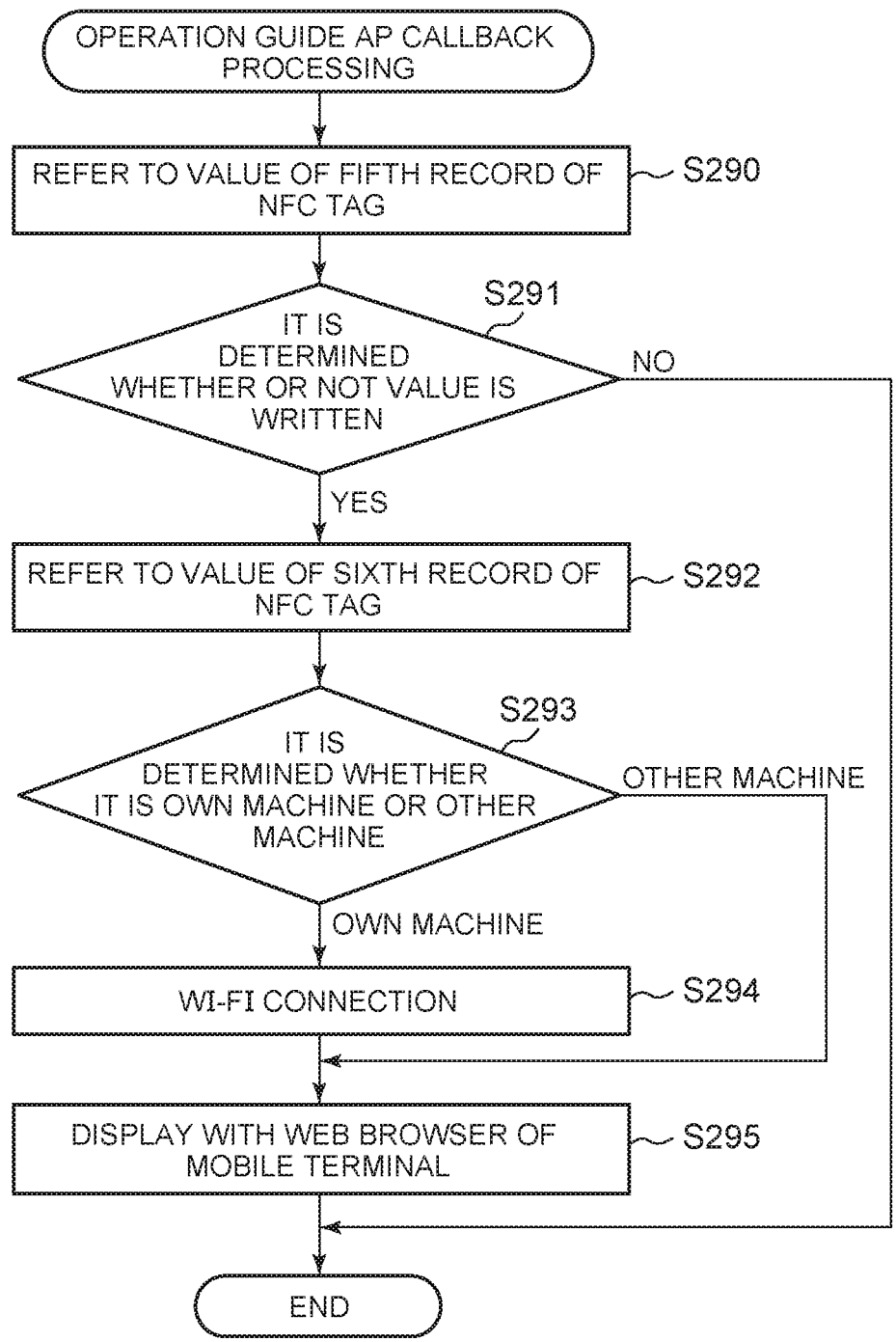
FIG. 59 is a flowchart illustrating callback processing of the operation guide AP according to the second embodiment of the invention.

FIG. 59 is a flowchart illustrating callback processing of the operation guide AP 123 according to the second embodiment of the invention.

This flow is executed from the NFC tag detection unit 225.

The operation guide AP 123 refers to the value of the fifth record 243 *e* of the NFC tag 243 read via the NFC I/F unit 211 and the NFC I/F unit 241 (S290). If no value is stored in the fifth record 243 *e* (S291), the operation guide AP 123 ends processing without doing anything. If a value is stored in the fifth record 243 *e* (S291), processing proceeds to step S292.

In step S292, the operation guide AP 123 refers to the value of the sixth record 243 *f* of the NFC tag 243. If the value of the sixth record 243 *f* is "0 (own machine)" (S293), processing proceeds to step S294. If the value of the sixth record 243 *f* is "1 (other machine)" (S293), processing proceeds to step S295.

In step S294, the operation guide AP 123 performs Wi-Fi direct connection with the MFP 240 based on the values of the first record 243 *a* to the fourth record 243 *d* of the NFC tag 243. Then, processing proceeds to step S295.

In step S295, the operation guide AP 123 accesses the URL indicated by the fifth record 243*e* of the NFC tag 243, and displays the image of the Web page on the display unit 113 using the Web browser.

When the value of the sixth record 243 *f* of the NFC tag 243 is "1 (other machine)", the operation guide AP 123 does not need to establish a new Wi-Fi connection. The operation guide AP 123 may communicate via an already connected access point.

In the case of going through step S294, for example, the image to be displayed is the image of a screen for changing a menu IM4 shown in FIG. 12. On the other hand, in the case not going through step S294, the image to be displayed is the screen image for explaining the copy operation IM3 shown in FIG. 11.

FIG. 60 is a flowchart illustrating callback processing of the hold over print AP 124 according to the second embodiment of the invention.

This flow is executed from the NFC tag detection unit 225.

The hold over print AP 124 refers to the value of the first record 243 *a* of the NFC tag 243 read via the NFC I/F unit 211 and the NFC I/F unit 241 (S300). If no value is written in this first record 243*a* (it is an empty character column) (S301), the hold over print AP 124 ends processing without doing anything. If a value is written in this first record 243*a* (S301), processing proceeds to step S302.

In step S302, the hold over print AP 124 reads information from the first record 243 *a* to the fourth record 243 *d* of the NFC tag 243. Then, the hold over printing AP 124 performs Wi-Fi direct connection with the MFP 240 based on read information.

Then, according to the mechanism of the Wi-Fi direct printing, the printing AP 124 issues a print request to the MFP 240 for the print image IM1 displayed on the display unit 113 (S303).

As described above, according to the second embodiment, the mobile terminal 210 compares the device state of the MFP 240 with the device state of the mobile terminal 210, and determines the behavior of the mobile terminal 210 that the user most desires. By simply holding the mobile terminal 210 over the MFP 240, the user can acquire not only error information but also optimum information desired by the user at that point in time, and can execute the function.

In the second embodiment described above, it is described that the operation guide AP 123 and the hold over print AP 124 perform Wi-Fi direct connection between the mobile terminal 210 and the MFP 240. However, if a wireless access point is already set in the mobile terminal 210 and the MFP 240 has the function of a wireless access point, the mobile terminal 210 temporarily stores the setting of the current wireless access point. Then, after switching to the wireless access point of the MFP 240 and performing necessary processing, returning to the stored setting of the previous wireless access point is general processing.

In the first embodiment and the second embodiment described above, the MFP 140 and the MPF 240 are described as image forming apparatuses, but the first embodiment and the second embodiment are not limited to such examples. For example, the image forming apparatus may be a printer, a copying machine, and a facsimile apparatus. In the first embodiment and the second embodiment described above, the mobile terminal 110 and the mobile terminal 210 are also referred to as a first information processing apparatus and the MFP 140 and the MPF 240 are also referred to as a second information processing apparatus, but the mobile terminal is also referred to as a second information processing apparatus and the MFP is also referred to as a first information processing apparatus. In the first embodiment and the second embodiment described above, information corresponding to the status of the mobile terminal 110 and the mobile terminal 210 are also referred to as first apparatus status information and information corresponding to the status of the MPF 140 and the MPF 240 are also referred to as second apparatus status information, but information corresponding to the mobile terminal is also referred to as second apparatus status information, and information corresponding to the MPF is also referred to as first apparatus status information.

The invention claimed is:

1. An image forming apparatus that is provided with a display screen and communicates with a mobile terminal, comprising:

a communication unit that communicates with the mobile terminal;

a first acquiring unit that acquires first apparatus status information that indicates an apparatus status of the mobile terminal from the mobile terminal via the communication unit, the mobile terminal being configured to be able to execute multiple types of applications, the first apparatus status information including at least one application type datum specifying a type of application running in the mobile terminal among the multiple types of applications;

a second acquiring unit that acquires second apparatus status information that indicates an apparatus status of the image forming apparatus, the image forming apparatus being configured to be able to display multiple screen images, the second apparatus status information including at least one screen status datum specifying a screen image that is displayed on the display screen of the image forming apparatus among the multiple screen images; and a control unit that stores multiple pieces of supply information to be supplied to the mobile terminal, the supply information being designed to be useful for a user who uses the mobile terminal at the timing, select one piece of the supply information based on a combination of the first apparatus status information and the second apparatus status information, the selected one of the supply information being defined as a selected supply information, and supply the selected supply information to the mobile terminal via the communication interface unit.

2. The image forming apparatus according to claim 1, wherein:

the communication unit is a communication interface unit that communicates with the mobile terminal when the mobile terminal is within a predetermined range from the image forming apparatus.

3. The image forming apparatus according to claim 2, wherein:

the control unit includes a detection unit that detects whether or not the mobile terminal is within the predetermined range from the image forming apparatus;

the first acquiring unit accesses the mobile terminal via the communication interface unit and acquires the first apparatus status information when the detection unit detects the mobile terminal.

4. The image forming apparatus according to claim 3, wherein the first acquiring unit specifies a movement condition of the application running in the mobile terminal.

5. The image forming apparatus according to claim 4, wherein the movement condition of the application is a movement condition of an application displayed on a foreground of a display unit of the mobile terminal.

6. The image forming apparatus according to claim 1, wherein the mobile terminal is configured to simultaneously run multiple applications, and the type of application included in the first apparatus status information indicates one of the applications.

7. The image forming apparatus according to claim 6, wherein the image forming apparatus stores multiple apparatus statuses relating to the display screen, and the apparatus status indicated by the second apparatus status information is selected from the multiple apparatus statuses stored in the image forming apparatus.

8. The image forming apparatus according to claim 7, wherein the image forming apparatus stores multiple commands to be executed in the mobile terminal, the control unit of the image forming apparatus determines either to select or not to select one of the commands based on the first apparatus status information and the second apparatus status information, and the information transmitted to be the mobile terminal from the image forming apparatus includes the selected one of the commands if the control unit of the image forming apparatus determines to select such that the mobile terminal executes the selected one of the commands when receiving the information.

9. The image forming apparatus according to claim 1, wherein:

the first apparatus status information includes information specifying an application displayed on a foreground of a display unit of the mobile terminal.

10. The image forming apparatus according to claim 1, wherein:

the second apparatus status information includes print acceptability information and panel locking information, the print acceptability information indicates whether or not the image forming apparatus is able to accept printing, and the panel locking information indicates whether or not a panel lock screen image is being displayed on the display screen.

11. A communication system in which a mobile terminal and an image forming apparatus provided with a display screen, comprising:

the image forming apparatus including a communication unit, a first acquiring unit, a second acquiring unit, and a first control unit, the communication unit that communicates with the mobile terminal;

the first acquiring unit that acquires first apparatus status information that indicates an apparatus status of the mobile terminal from the mobile terminal via the communication unit, the mobile terminal being configured to be able to execute multiple types of applications, the first apparatus status information including at least one application type datum specifying a type of application running in the mobile terminal among the multiple types of applications;

the second acquiring unit that acquires second apparatus status information that indicates an apparatus status of the image forming apparatus, the image forming apparatus being configured to be able to display multiple screen images, the second apparatus status information including at least one screen status datum specifying a screen image that is displayed on the display screen of the image forming apparatus among the multiple screen images; and the first control unit that stores multiple pieces of supply information to be transmitted to the mobile terminal, the supply information being designed to be useful for a user who uses the mobile terminal at the timing, selected one piece of the supply information based on a combination of the first apparatus status information and the second apparatus status information, the selected one of the supply information being defined as a selected supply information, and supply the selected supply information to the mobile terminal via the communication interface unit.

12. A mobile terminal that communicates with an image forming apparatus that is provided with a screen display and is configured to be able to display multiple screen images, comprising:

a communication unit that communicates with the image forming apparatus;

a first acquiring unit that acquires first apparatus status information that indicates an apparatus status of the image forming apparatus from the image forming apparatus via the communication unit, the first apparatus status information including screen status information specifying a screen image displayed on the display screen of the image forming apparatus among the multiple screen images;

a second acquiring unit that acquires second apparatus status information that indicates an apparatus status of the mobile terminal, the mobile terminal being configured to be able to execute multiple types of applications, the second apparatus status information including application type information specifying a type of application running in the mobile terminal among the multiple types of applications; and a control unit that obtains supply information, which is determined based on a combination of the first apparatus status information and the second apparatus status information, the supply information being designed to be useful for a user who uses the mobile terminal at the timing, and displays either the supply information or information derived from the supply information.

13. The mobile terminal according to claim 12, wherein a control unit of the image forming apparatus accesses information of a storage unit changed according to the apparatus status of the image forming apparatus via the communication unit.

14. The mobile terminal apparatus according to claim 13, wherein information of the storage unit is information specifying the screen image displayed on the display screen of the image forming apparatus; and the first acquiring unit accesses information specifying the screen image via the communication unit.

* * * * *